Figure 1:
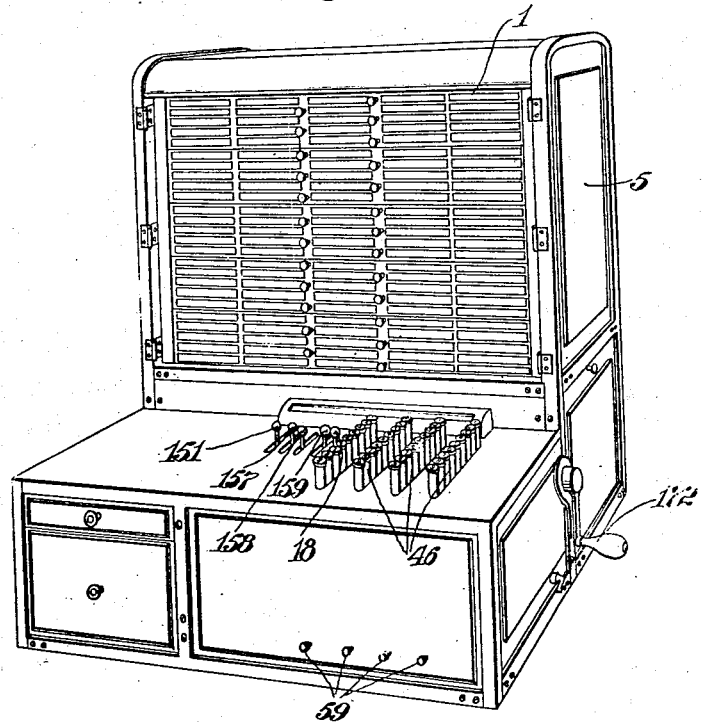

G. WHITE.
REGISTER.
APPLICATION FILED JUNE 16, 1910.

1,114,085.

Patented Oct. 20, 1914.
8 SHEETS—SHEET 1.

G. WHITE.
REGISTER.
APPLICATION FILED JUNE 16, 1910.

1,114,085.

Patented Oct. 20, 1914.
8 SHEETS—SHEET 2.

G. WHITE.
REGISTER.
APPLICATION FILED JUNE 16, 1910.

1,114,085.

Patented Oct. 20, 1914.
8 SHEETS—SHEET 3.

Attest:

Inventor: George White
by Frank P. Wentworth
his Atty.

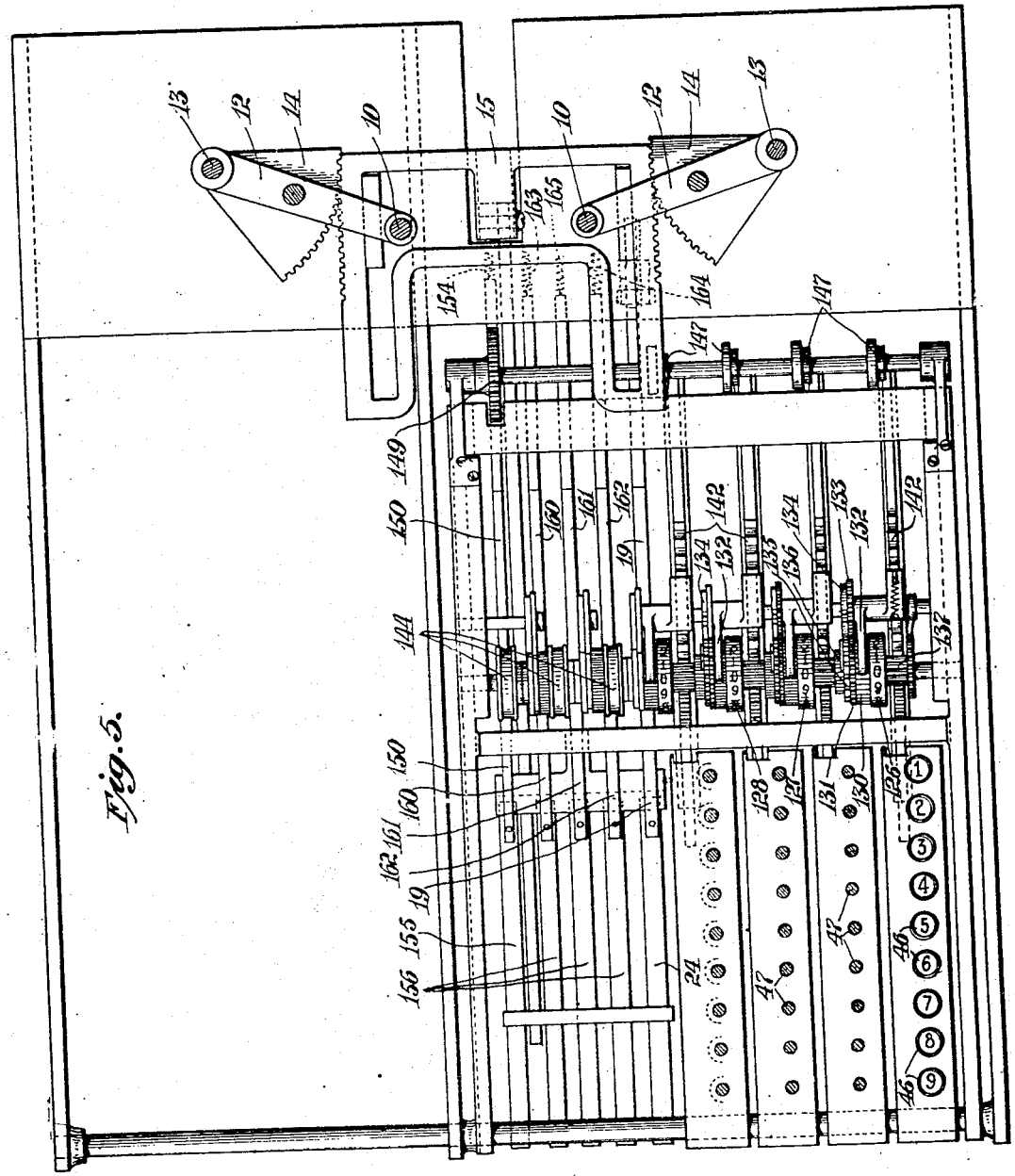

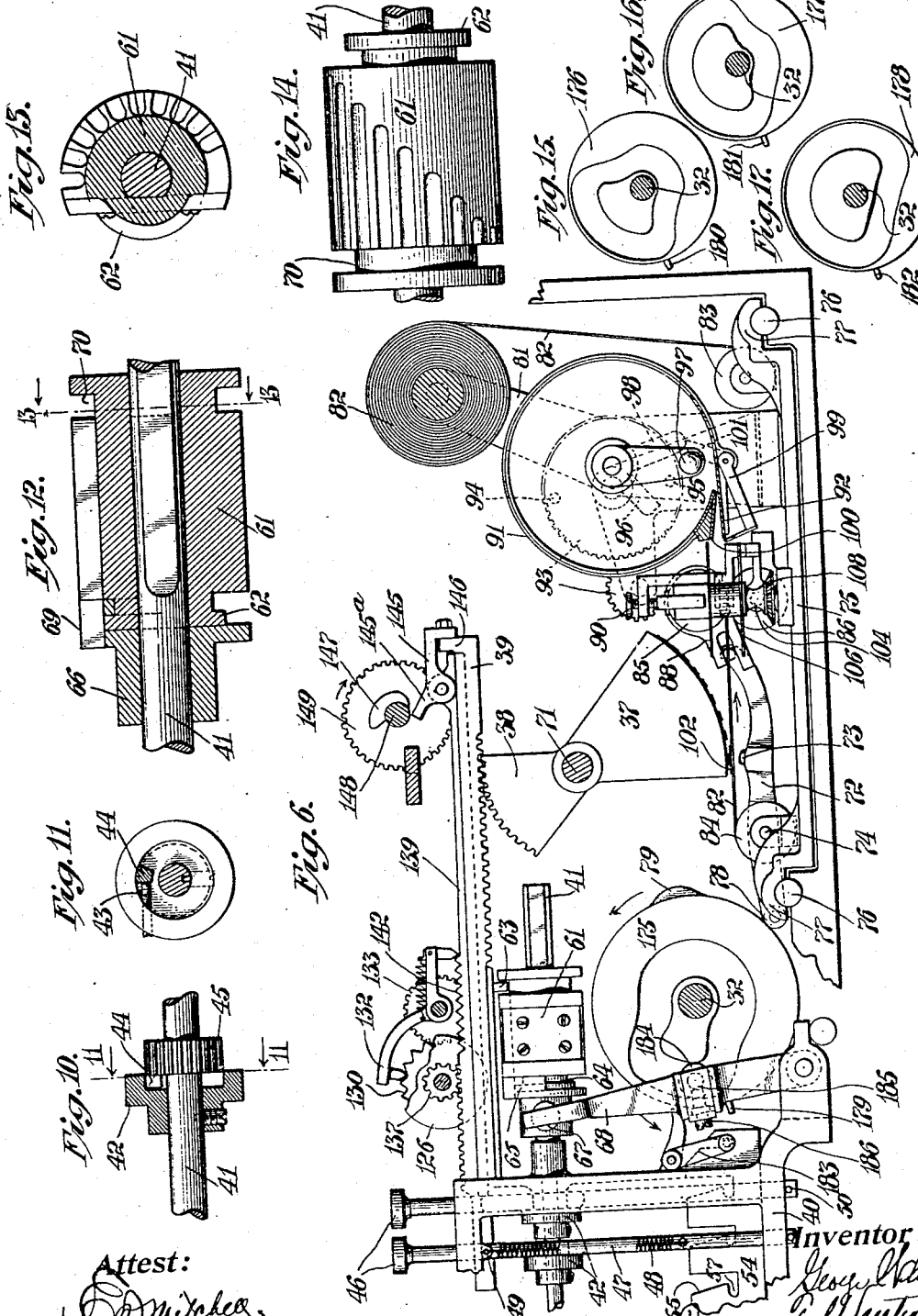
G. WHITE.
REGISTER.
APPLICATION FILED JUNE 16, 1910.
1,114,085.
Patented Oct. 20, 1914.
8 SHEETS—SHEET 5.

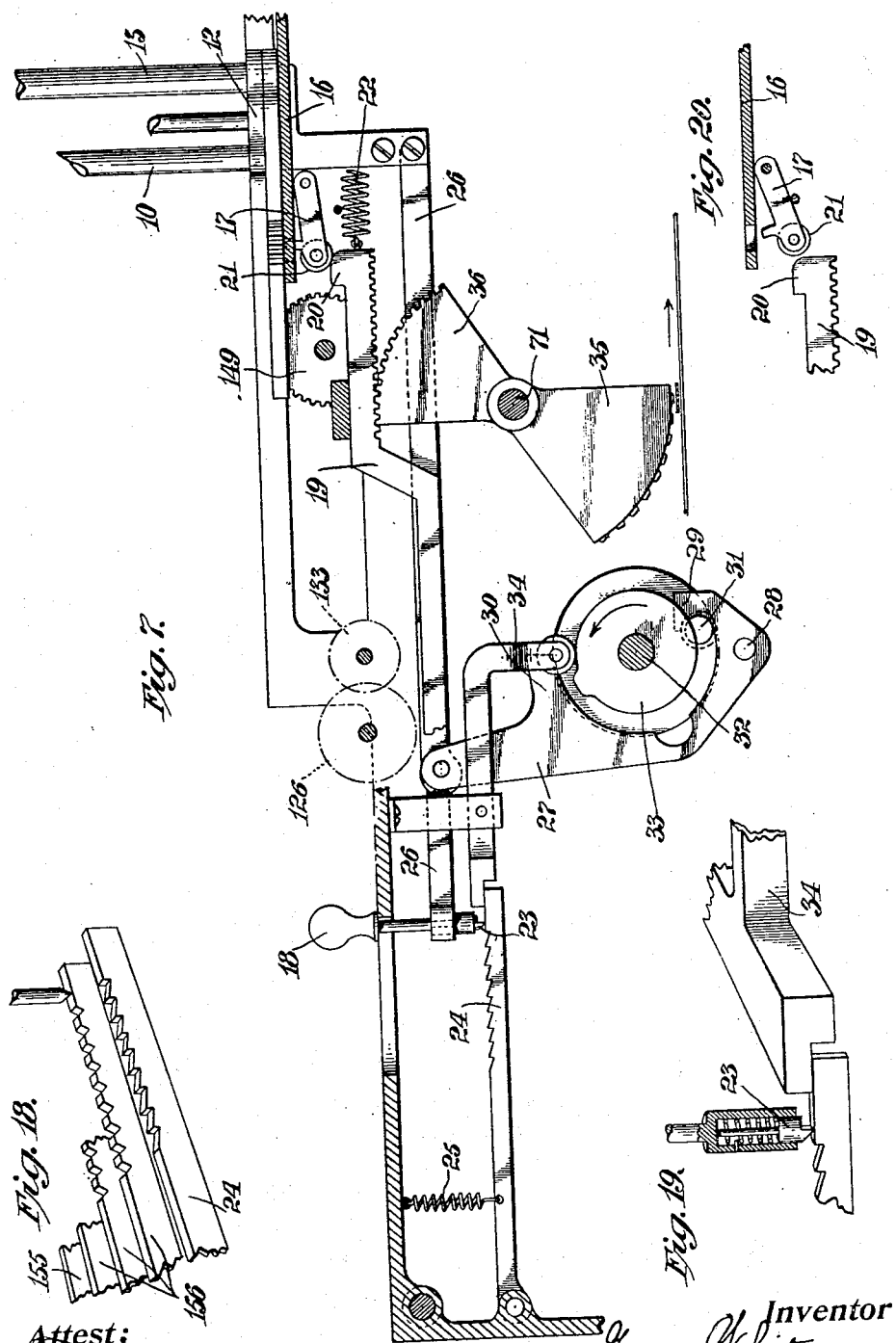

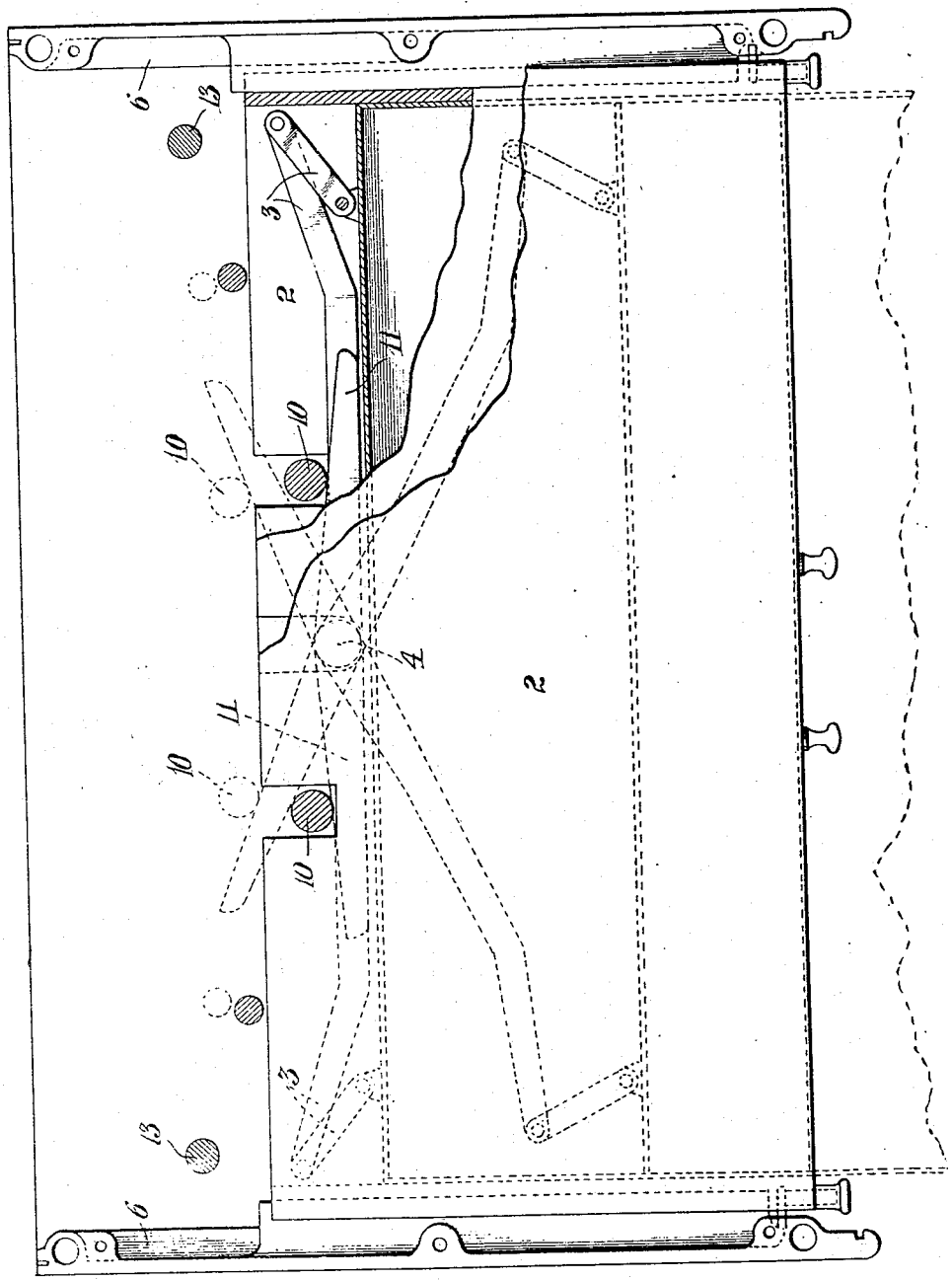

G. WHITE.
REGISTER.
APPLICATION FILED JUNE 16, 1910.

1,114,085.

Patented Oct. 20, 1914.
8 SHEETS—SHEET 8.

Attest:
E. O. Mitchell
Aaron Ginsburg

Inventor: George White
by Frank P. Wentworth
his Atty.

UNITED STATES PATENT OFFICE.

GEORGE WHITE, OF JERSEY CITY, NEW JERSEY, ASSIGNOR, BY MESNE ASSIGNMENTS TO AUTOMATIC BOOK-KEEPING REGISTER COMPANY, A CORPORATION OF DELAWARE.

REGISTER.

1,114,085.     Specification of Letters Patent.     Patented Oct. 20, 1914.

Application filed June 16, 1910. Serial No. 567,128.

*To all whom it may concern:*

Be it known that I, GEORGE WHITE, a citizen of the United States, residing at Jersey City, in the county of Hudson and State of New Jersey, have invented certain new and useful Improvements in Registers, of which the following is a specification, reference being had therein to the accompanying drawings, which form a part thereof.

My invention relates to registers and more particularly to a class of account registers wherein the essential characteristics are a mechanism for recording individual transactions and a series of files adapted to receive autographic records of such transactions.

One object of my invention is to provide a register of this character wherein a normally closed and locked filing device will be under control of an independent, or identification key, in operative connection with the recording mechanism so that the printed record will disclose the identifying mark of the person or clerk who opened or released the files.

A further object is to provide a register of this character wherein the identification key having been once set, and a file opened, the identification key will remain set and the locking device for the file will remain inoperative until the actuation of the recording mechanism, in order to secure a complete record of the operation of the machine irrespective of whether or not any amount is recorded by the recording mechanism.

A still further object is to provide a device of this character, embodying a plurality of independent filing devices wherein said devices after the identification key has once been set, may be opened and closed at will, but may be locked only upon the actuation of the recording mechanism.

A still further object is to provide in a device of this character a plurality of superposed sliding file drawers, and means common to all of said drawers whereby the actuation of the recording mechanism will close and lock any one of said drawers.

A still further object is to provide in a device of this character locking means, parts of which are carried by the individual file devices and other parts of which are carried by the casing containing same, said parts being so constructed and arranged as to cause the actuation of the identification key to release the said last mentioned parts, the opening of any drawer serving to actuate said last mentioned parts in a manner to make them inoperative until the recording mechanism has been actuated, whereupon they will restore any open filing device to the closed and the locked position and lock all filing devices.

A still further object is to provide a device of this character embodying a plurality of individual slidable file drawers arranged in separable, independent groups or sections and means adapted to automatically close and lock any of said drawers with the actuation of the recording mechanism, wherein such filing means are so constructed and arranged as to permit the addition of any number of groups or sections of drawers for the purpose of expanding the filing system, and the removal of all of the filing devices from the machine to a fireproof vault.

A still further object is to provide in a device of this character employing a plurality of independent filing devices and a recording mechanism of a series of accounts keys adapted to be selectively operated, and in operative connection with a portion of the recording mechanism, whereby, prior to the making of a record, the exact account in which a charge is being made may be indicated by the recording mechanism, for securing a reference in the printed record to the definite account in which charges have been made for the purpose of checking or balancing autographic and mechanically made records.

A still further object is to provide a machine embodying an individual transaction recording mechanism and a totalizer actuated in conjunction with said recording mechanism, wherein the means actuating the totalizing mechanism may be rendered inoperative at the will of the operator to permit the inclusion in the printed record of special transactions such as cash transactions, credits for returned goods, goods delivered C. O. D., cash payments on account, and various other conditions which arise in the character of business in which a machine of this character is generally used.

A still further object is to provide a device of the character immediately above specified wherein the means throwing the totalizing mechanism out of gear will simultaneously set a portion of the printing mechanism to indicate the nature of the special transaction, which means is operated by a special transaction key.

A still further object is to provide a machine embodying a plurality of normally closed and locked filing devices and a mechanical recording mechanism wherein the actuation of the recording mechanism is normally prevented through a mechanism controlled by the filing devices, the actuation of the filing devices releasing or permitting the operation of the recording mechanism and the actuation of the recording mechanism restoring the filing devices to their normally closed and locked position, the restoration of said devices automatically effecting the locking of the recording mechanism to limit the operation of the machine to the making of a single record.

A still further object is to provide in a machine of this character, a filing device embodying therein a plurality of slidable file drawers, each drawer having a plurality of filing compartments provided with individual normally closed covers, whereby secrecy may be preserved as to the contents of the other compartments in the drawer when filing in any compartment, any raised cover being adapted to be automatically closed by the closing of the drawer.

A still further object is to provide an account and special transaction recording mechanism embodying spring restored racks actuating the type members appurtenant thereto, where in the account and special transaction keys may be set at any desired point indicating the record to be made, and will hold the type members in their set position, against the tension of said springs, while permitting the free adjustment of the keys for correcting accounts, said holding means being rendered inoperative with the actuation of the recording mechanism.

A still further object is to provide in a machine of this type, a plurality of rack controlled type members, a rack controlled total adder, independent racks controlling said type members and the several members of said total adder respectively, and means whereby said racks may be actuated by the main actuating mechanism to simultaneously set the type, prior to the printing interval, and add the amount indicated by said set type to the total adder, or the racks controlling said type members may be actuated independently to record transactions, without including them in the total adder.

A still further object is to provide a rack mechanism of the character above described, the quantitative movement of both of which racks will be controlled by a single set of digit keys.

A still further object is to provide a rack mechanism of the character above referred to embodying therein a simple coupling mechanism for so uniting the two racks that the movement of the total adder rack will be under the control of the type setting rack, when said racks are coupled, or said last mentioned rack can be caused to move independently of said total adder rack at the will of the operator.

A still further object is to provide in a machine of this character a filing device consisting of one or more file drawers slidably mounted in a casing, so as, when opened, to expose the filing compartments thereof, but so connected with the casing as to limit the extent to which the file may be withdrawn, and thus prevent the removal of any file from the casing, while permitting any drawer or drawers to be opened and closed at will when the locking mechanism thereof is released.

A still further object is to provide in a machine of this character a filing device consisting of a plurality of groups of sliding file drawers each group being mounted in an individual casing adapted to be removably attached to the machine, all drawers in a group being secured to their casings by means limiting the extent of withdrawal of any drawer, which means will, with the movement of the drawer, be so set as to cause said means to close the drawer simultaneously with the actuation of the recording mechanism.

A still further object is to provide a machine of this character wherein the sole function of the number or digit keys will be to set a mechanism, the subsequent operation of which will effect the setting of the type members, thus resulting in a machine wherein the work done by the depression of any key will be so minimized as to result in a light touch in the machine, while at the same time permitting the setting of the type members by a differential movement thereof through a uniform movement of the main actuating mechanism. This results in uniform conditions in the operation of the machine and avoids a racking of the machine through the application of unequal degrees of force during different operations thereof.

A still further object is to provide a machine of this character employing a plurality of sets of digit keys the actuation of which will establish such a relation of parts, that, with the actuation of the main actuating mechanism, the various type members would be set, the imprint taken therefrom, and the parts restored to normal.

A still further object is to provide a machine of this character embodying therein a coupling member normally disengaged from the rack or other means, controlling the type members and under such control of the digit keys as to set the same; and a main actuating mechanism having a definite movement resulting in a differential movement of said racks, or other members, controlling the type members through said interposed coupling member.

A still further object is to provide a device embodying a plurality of racks, or other members actuating the type members and actuating means for setting and restoring said racks, or other members, whereby the use of springs in connection with said racks, or other members may be dispensed with.

A still further object is to provide a machine of this character embodying therein a plurality of type members, a plurality of digit keys arranged in sets corresponding in number to said type members, actuating means for said type members and a member interposed between said digit keys and said type members, common to all keys in a set and adapted to be adjusted by any said key to impart a differential movement to said type member actuating means, thus providing a mechanism wherein the type member is entirely independent of the digit keys and a single mechanism common to, and capable of operation by any key in a set is capable of setting said interposed member differentially.

A still further object is to provide in a type member setting a mechanism of the character immediately above referred to, a mechanism coöperating with each key whereby the interposed member will be differentially actuated to secure that variable adjustment necessary to accomplish the proper setting of the type member without interference of any kind from the remaining keys in the set.

A still further object is to provide in a type setting mechanism of the character immediately above specified, means whereby the individual digit keys will be restored to normal after the completion of one cycle of operations of the machine, and means acting directly upon the interposed coupling member for restoring said coupling member to normal, independently of the digit keys, thus relieving the digit key springs from the work of controlling the coupling member and the mechanism setting same.

A still further object is to provide in a machine of this character a coupling member normally so set as to be inoperative upon its rack, or other means, controlling the type member.

A still further object is to provide each set of digit keys with a lock or detent member adapted to engage any depressed key and hold it in the depressed position until said detent member is actuated at the completion of the cycle of operations of the machine to release the depressed key in that set, the said detent member having as an essential characteristic a structure whereby the depression of any other key in the same set will accomplish the release of any depressed key and operate the restoring means for the coupling member to permit the variance of the positioning or adjustment of this member to correct the adjusted position of the members utilized in setting the type members.

A still further object is to provide a detent member of this character which may also be operated by means of a separate plunger, the sole function of which is to control this detent plate.

A still further object is to provide in a machine of this character a rotary member under the control of the digit keys and interposed between said keys and the member setting the type members whereby the number to be set upon the type members will be determined through the rotation of said interposed member, and the actual setting will be accomplished by the axial movement thereof under the control of the main actuating mechanism, thus relieving the digit keys from any of the work incidental to the setting of the type members and the actuation of the total adder when such forms an operative part of the machine under the control of said interposed member or said type setting means.

A still further object is to provide an interposed coupling member of this character having a series of impact couplings whereby such lost motion will occur between said interposed member and the type setting member as to result in the differential movement of the latter; said coupling member also having a circular impact surface for the purpose of securing the return movement of the type setting members under its control while permitting the free rotation thereof.

A still further object is to provide actuating means for each said coupling which while imparting to said interposed member a reciprocating movement to accomplish the setting of the type member, will permit the free rotation of said interposed member in adjusting it to position under the control of a digit key.

A still further object is to provide a plurality of such interposed members and a plurality of such actuating members which last mentioned members will be actuated during succeeding intervals during the operation of the machine to insure the accurate carrying operation of the total adder, when such is in operative connection with the main actuating mechanism.

A still further object is to provide in a machine of this type embodying a plurality of successively operated members setting the type members, actuated from a single source of power and at one operation, means, which after all of the type members have been properly set, will make an imprint therefrom, and will also be actuated from the same source of power and by a continuation of that movement required to set the various type members, the continued actuation, or movement, of this main actuating means accomplishing the restoration of the type members to their normal or "zero" position.

A feature of the machine is to provide means whereby the nature of the record of the different transactions may be varied at the will of the operator, the record, however, being without his control and means being provided whereby transactions other than charge transactions will not appear upon the total adder or register.

A still further object is to provide a machine of the character described which will be composed throughout of unitary structures each of which is sufficiently independent of any other to permit an expansion or contraction in the capacity of the machine by a mere elimination, or duplication, of parts, the interchangeable parts throughout simplifying its manufacture and repairs. And a still further object is to incorporate in a machine various mechanisms affording that adjustment necessary to compensate for wear or insure that synchronism in the operation of the various coöperating parts necessary to a finely adjusted machine of this character.

The invention consists in the novel features of construction and combination of parts as are hereinafter set forth and described, and more particularly pointed out in the claims hereto appended.

Figure 2:
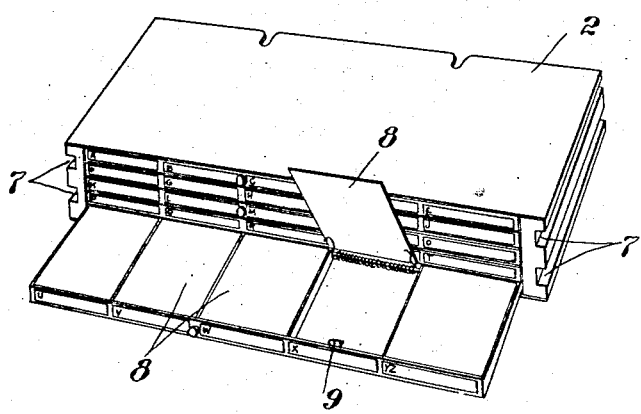
Figure 3:
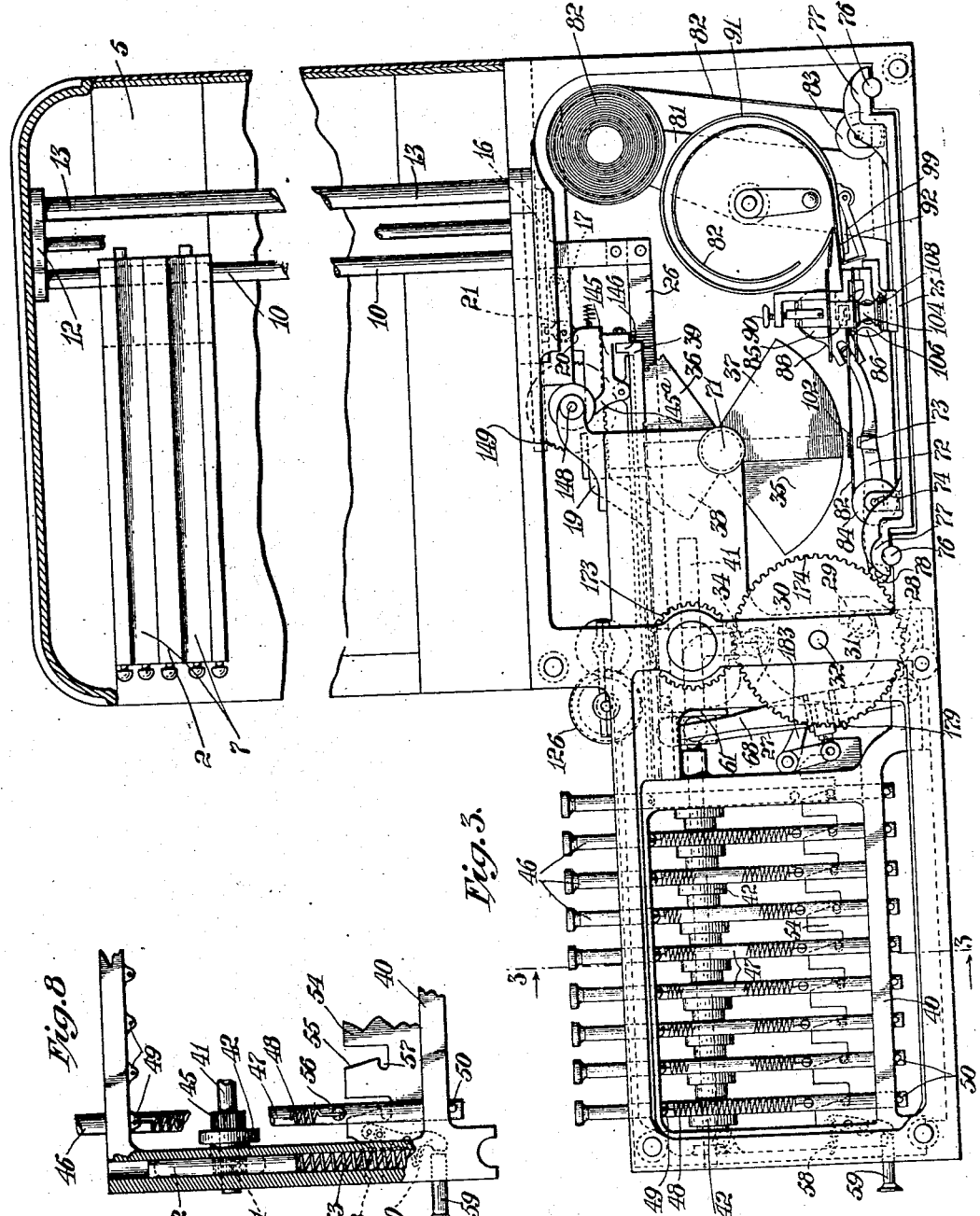
Figure 4:
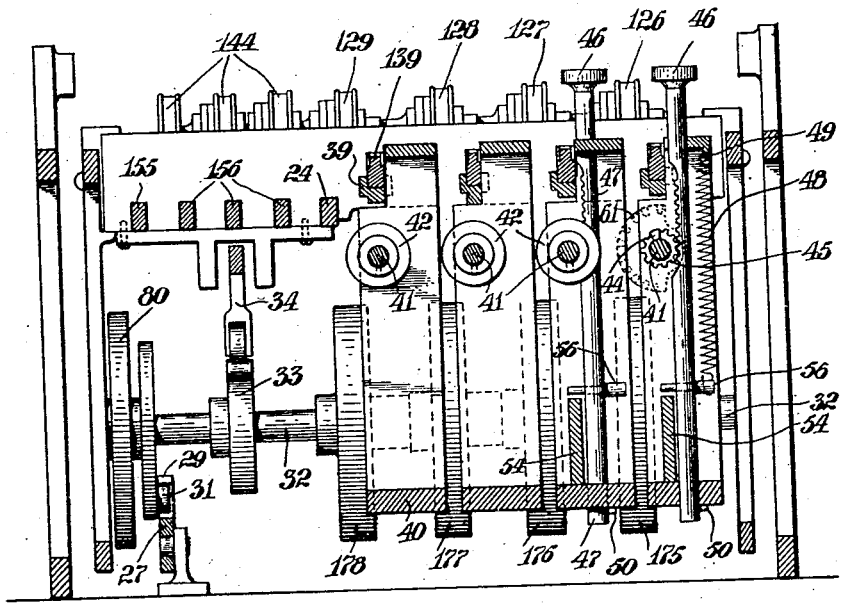
Figure 9:
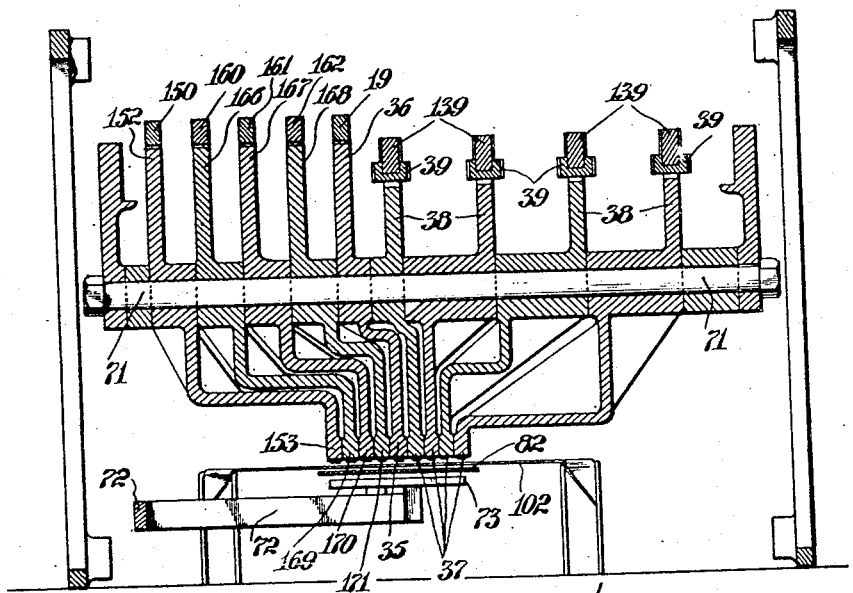

Referring to the drawings:—Figure 1 is a perspective view of a machine embodying my invention; Fig. 2 is a detailed view of one of the sections or groups of filing drawers, one drawer contained in said section or group being shown open with the cover of one compartment raised; Fig. 3 is a side elevation of the interior mechanisms of the machine; Fig. 4 is a vertical section on line 3—3 of Fig. 3, the filing devices not being shown; Fig. 5 is a plan view of the interior mechanisms contained in the lower portion of the casing or cabinet; Fig. 6 is a detail side elevation of one element of the type setting mechanism, the recording mechanism and the registering mechanism, a portion only of the key board mechanism being shown; Fig. 7 is a detail view in side elevation of the filing device controlling mechanism, and that portion of the recording mechanism appurtenant thereto; Fig. 8 is a detailed view of the restoring mechanism for one of the interposed coupling members, and includes the justification key and a portion of the key board mechanism adjacent thereto; Fig. 10 is a detailed sectional view of one adjustment box and its actuating mechanism; Fig. 9 is a detailed sectional view of the printing segment and the parts appurtenant thereto; Fig. 11 is an elevation upon line 11—11 of Fig. 10; Fig. 12 is a longitudinal section of the coupling member; Fig. 13 is a section on the line 13—13 of Fig. 12; Fig. 14 is an elevation of said coupling member; Figs. 15, 16 and 17 are details of the second, third and fourth cams for actuating the respective coupling members; Fig. 18 is a detailed perspective view of the detent for the special transaction, accounts and identification keys; Fig. 19 is a detailed perspective view of the lower portion of the identification key, its detent, and a portion of the detent releasing mechanism; Fig. 20 is a detailed view of the locking pawl controlling the mechanism locking the several filing devices; Fig. 21 is a horizontal view, partly broken away, of one of the drawer sections, shown in Fig. 2, and Figs. 22, 23 and 24 are detail views of the record strip and ribbon feeding and reversing mechanisms.

Like letters refer to like parts throughout the several views.

A machine of this character embodies the following essential elements in combination:—A filing device adapted to receive and retain autographic records of different transactions, which device is normally closed and locked, is capable of being opened when the machine is set for operation and is restored to normal position with such operation; a type setting mechanism including a key board; a recording mechanism including the type members, the imprint making mechanism and the record strip feeding mechanism; and the main actuating mechanism. Preferably in this combination a register or total adder is included for the purpose of showing the total charge business during any desired interval shown upon the record strip. These elements are the essential elements considered in their broader aspects, the machine including as sub-combinations a special file mechanism and a special mechanism controlling same; a special form of type setting mechanism for modifying the operation of the main mechanism in a manner to permit the recording of special transactions; special printing adjuncts for indicating the account in which a charge has been made upon the record, and the clerk making this charge; a special type of differential mechanism for the main type setting mechanism; a special form of record strip feeding mechanism; a special form of key board; a special form of ink ribbon feeding and reversing mechanism; a special form of main actuating mechanism and a special form of register adapting it to the other coöperating parts of the machine.

In describing the invention I will follow the above classification; in the interests of perspicuity, and in the description of the mode of operation of the device, I will point out the sequence of operations and the relative effect of different elements in the combination upon other elements.

The filing device preferably consists of a plurality of drawers 1, slidably mounted in a suitable supporting casing 2, each said drawer being connected to said casing by means of pivotally connected links 3, one lever being pivoted to the drawer, and the other to the casing at 4, as shown in Fig. 21. Preferably each casing 2 is of a dimension to retain five of these drawers, thus affording a compact group or section of such drawers so associated as to permit the simultaneous withdrawal of the entire group, as when at night time it is desired to place the accounts in a fire proof safe or vault. By this construction any drawer in a section or group may be moved independently of any of the other drawers, the links 3 limiting the extent of withdrawal of the drawer and preventing its removal from its casing. A plurality of such sections or groups are mounted with relation to the machine, to give the desired capacity, and at the same time permitting an expansion of the system to any desired extent, these casings being retained in position in any desired manner, as by means of the cabinet 5, the lower portion of which contains the works of the machine. In this preferred construction the upper part of the cabinet 5 contains slides 6 on the opposite sides thereof coöperating with grooves 7 in the sides of the casings 2. Any desired means of securing the casings 2 within said cabinet may be employed.

To insure capacity in the machine, I divide each filing drawer into a plurality of file compartments, as shown in Fig. 2, each compartment being closed by a cover 8 connected to the drawer by a spring hinge, a latch 9 being provided to hold this cover in its closed position, so that, as a drawer is withdrawn, the contents of all of the compartments in the drawer will be concealed and any compartment may be opened to permit access thereto without exposing the contents of any other compartment. The spring hinge of said cover is arranged toward the rear of the compartment (see Fig. 2) so that as the drawer is closed, the engagement of said cover with the drawer above will automatically close and lock it.

The several drawers 1 are normally locked in the closed position by means of the lock rods 10 extending from the bottom of the upper cabinet 5 to the top thereof so as to be common to all drawers in the device, these rods being arranged on opposite sides of the center of each drawer and coöperating with extensions 11 of the levers 3, beyond the pivot 4, thus imparting to said levers the further function of serving as a means through which the drawers are automatically closed and locked. The rods 10 are carried between the lever arms 12 at the top and bottom of the system of file cases, and are rotatable about the pivots 13 by means of the segmental racks 14 in mesh with racks carried by the reciprocating frame 15, (see Figs. 5 and 7) which frame is normally locked by means of the socket plate 16 carried thereby, and the oscillating bolt 17 through which the normally-closed and locked drawers are controlled by means of a special key 18 and a connecting rod 19 having a lifting cam 20 coöperating with an anti-friction roller 21 carried by the bolt 17. The rod 19 is normally drawn toward the bolt 17 by means of the spring 22. By this construction as the key 18 is drawn forwardly it permits the bolt 17 to drop out of engagement with its socket and permits the rods 10 to be forced rearwardly (see Fig. 5) upon the withdrawal of any drawer in the machine, by means of the extensions 11 carried thereby. The key 18 carries a spring pressed plunger pawl 23 coöperating with a ratchet bar 24, the spring 25 normally preserving the locking position between said pawl and its ratchet and preventing the restoration of the bolt 17 to its locked position except upon the disengagement of the pawl 23 and ratchet 24 in a manner to be hereinafter described, which occurs only upon the completion of an entire cycle of operations of the machine. The frame 15 has pivoted thereto a forwardly projecting rod 26 the forward end of which has pivoted thereto a locking lever 27 (pivoted at 28) having two oppositely disposed arms 29 and 30, the first of which is adapted to engage the lock pin 31 carried upon a disk keyed to the main operating shaft of the machine, to lock the entire machine until after a drawer has been opened, and the other arm of which is adapted to be engaged by said pin for the purpose of restoring the rods 10, and with them any opened drawer, to the normal position where the bolt 17 will, by the return movement of the rod 19 under its spring 22, lock all parts of the machine. The main shaft 32 has keyed thereto a cam 33 adapted to engage and oscillate a locking lever 34 one end of which is adapted to engage and depress the ratchet 24 for the purpose of releasing the rod 19 to accomplish this restoration of the locking bolt 17 to normal.

An incidental function of the key 18 is to establish the identity of the clerk making the charge, and I therefore associate with it a type bearing member 35 carrying a segmental rack 26 meshing with a rack forming a part of the rod 19, thus causing the movement of said rod to set an identifying mark or letter in the recording mechanism corresponding with the quantity of movement of said bar. Inasmuch as the key 18 thus not only unlocks the various drawers, but at the same time sets the printing mechanism for the purpose of identifying the clerk making the charge, I term this key the identification key to distinguish it from other keys incorporated in the machine.

The recording mechanism of the machine embodies therein a plurality of type members each bearing the nine digits, all these members being normally set at zero and each being under the control of an individual type setting mechanism including a series of digit keys controlling a member actuated by the main actuating mechanism to differentially reciprocate a rack meshing with a segmental rack 38 carried by the type member. Each of these type setting mechanisms is like every other included in the machine, these parts being multiplied merely to increase the capacity of the machine to the denomination desired, ordinarily four in number, to permit the recording of transactions up to $99.99; and a description of but one of them will be entered into. The rack 39 meshing with the segmental rack 38 is mounted toward the rear of the machine, and is in constant mesh with said rack 38, thus preventing any possibility of a loss of adjustment of these parts through the over-running of the type member through momentum. Forwardly of this rack member is a frame 40 which has mounted therein a horizontal rotary shaft 41 to which is keyed a plurality of adjustment boxes 42 (see Figs. 3, 4, 10 and 11) by means of which said shaft 41 is rotated. Each box 42 has interiorly thereof an adjustable abutment 43 adapted to be engaged by a tongue 44 carried by a pinion 45 loosely mounted upon said shaft, the rotative movement of said shaft being governed by the moment of initiative contact between said abutment and said tongue, thus permitting the rotation of said shafts in different degrees by the same degree of rotation of the different pinions included in a set. Mounted in vertical ways in the frame 40 are digit keys 46 the stems 47 of which have racks therein meshing with their respective pinions 45. Each key is normally raised by a spring 48 extending from the lower portion of the stem 47 to the lugs 49 in the upper frame, a construction which permits of the use of light tensioned springs which give a soft touch in the key board. Pins 50 carried by the stems 47 and engaging under the lower reach of the frame 40 limit the upward movement of the keys under their springs. Inasmuch as the pinions 45 have no control over the shaft 41, upon the return movement thereof, the sole function of the springs 48 is to lift the keys and restore the pinions 45 to their normal position, the actual work of restoring the said shaft 41 to its normal position being accomplished by means of a restoring mechanism, operating entirely independently of the several keys. This mechanism consists of a gear 51 keyed to the shaft 41 and having in mesh therewith a rack 52 which has constantly acting thereon, a spring 53 tending to restore said shaft 41 to normal. The imprint being made subsequent to the setting of the type members and the keys in the various sets being independently operative it is necessary to provide means for holding any single key depressed and at the same time preventing the depression of a second key in the same set without causing the key previously set to be raised to clear the key board. By locking the key in its depressed position, the shaft 41 is temporarily locked in its adjusted position and so maintained until the recording mechanism has been actuated, unless released by the depression of some other key in the same series. This locking is accomplished by a detent member consisting of a slidable plate 54 mounted in the lower part of the frame 40, which plate has upwardly presented a plurality of recesses having a cam surface 55 adapted to be engaged by the pin 56 on its key stem, and a horizontal notch 57 adapted to straddle and engage said pin when the plate is restored to its locking position by the spring 58. A suitable reciprocating mechanism for the plate is provided in conjunction with a main actuating mechanism which will be described in connection with such mechanism. If it is desired to entirely clear any series of digit keys, to restore the setting mechanism to the zero position, I provide means as the plunger 59 engaging the rocking lever 60 pivoted to its plate 54 for this purpose. By this construction I provide alternative means whereby the key board may be cleared either through the actuation of the main operating mechanism or by an independent justification key.

Splined to, or otherwise slidably mounted upon the shaft 41, is a horizontally reciprocating coupling member 61, the function of which is to differentially reciprocate its rack 39, when the main actuating mechanism is operated, said member having been previously set, to determine its operative effect, by the depression of one of the keys in the set controlling that shaft 41.

The coupling member 61 comprises a cylindrical or semi-cylindrical body having cut therein 10 slots or ways of differing lengths varying from one extending from end to end of the coupling so as to have no operative effect upon the rack 38, in graduated stages, to a short length slot which will have the maximum operative effect upon said rack, the degree of graduation being governed by the spacing of the type faces upon its type member 37, preferably being in direct arithmetical progression from the shortest to the longest slot. The end of the shaft 41 is flattened, as shown clearly in Figs. 12 and 13, and the coupling member is secured thereto by means of the face plate 62, this, however, being a mere detail of construction for facilitating assembling. Carried by the rack 39 is a stud 63 adapted to enter any of the aforesaid slots or ways in the coupling member 61, forming with the closed end of any slot, an impact coupling between the main operating mechanism and the type rack. At the forward end of the coupling member 61, as determined by its relation to the entire machine, is a circular groove 64 coöperating with a bead 65 upon a reciprocating block 66, pivotally connected, at 67, with the main actuating lever 68; said block being slotted at 69 (see Fig. 12) to permit the reciprocation of the coupling member 61 without imparting any movement whatever to its rack 39. The pivotal connection between the block 66 and its lever 67 may take any desired form, permitting that relative movement between the pivots and the lever, due to the arc described by the latter. To eliminate springs acting upon the racks 39, I form said coupling member with a groove at 70 forming a continuous circular face adapted to confine the tongue 63 in a manner to restore the rack 39, and with it the printing segments to the normal or zero position, upon the return movement of the coupling member under this lever. This construction permits the free rotation of the coupling member to permit the setting of same, the ways or slots above referred to, and the coöperating coupling member carried by the rack always being in the proper relative position, and avoiding the loss of register of these parts, or a variance in the quantity of movement of the rack under its coupling member, due to the failure of a spring, with a resulting confusion in the record itself due to the improper positioning of the type members. The arrangement of the ways in the block 61 and the coöperating tongue 63, affords lost motion between these members upon the actuation of the machine, in inverse proportion to the value of the type to be set, the higher the digits, the less the quantity of lost motion.

By this construction it will be observed that the type member is set through the same mechanism by any key in a series, thus resulting in a single transmission mechanism between the keys and the type member common to all said keys, said mechanism being normally inoperative as to the type member upon the depression of any key, the setting of the type being dependent upon and just prior to, the operation of the main actuating mechanism. This permits the setting and the adjustment of the machine in a manner to avoid, when the total adder or register is used in conjunction therewith, the simultaneous actuation of any number wheel in the said register or adder by its individual rack, and the transfer mechanism extending from the preceding denominational number wheel. It also avoids any possibility of a premature or accidental operation of the recording mechanism.

The recording mechanism comprises a plurality of number type segments 37, all mounted upon the same shaft 71 and actuated by an individual mechanism such as is above described; a mechanism for supporting and intermittently feeding a record strip across said type members and an inking ribbon mechanism, all of which will now be described in detail. The recording mechanism also includes the type segments 35 mounted upon the shaft 71, the types of which may either be letters, or any other special symbol, to indicate the clerk using the machine, these segments being under the control of the identification key 18, in the manner above described. In addition to these, I provide three additional number segments each under the control of its individual key, the purpose of which is to have appear on the record the number of the account in which a charge is being made, each of the file drawers being provided with suitable face index cards identifying the account within each compartment of each drawer. In addition to these type segments, I use still another segment under control of a special account key which will not only indicate upon the record the nature of any transaction other than a charge, but will at the same time throw the register mechanism out of gear so as to prevent the transaction included in the record from being added into the total business shown by the register. All of these segments are mounted upon the same shaft 71 and the type bearing faces thereof are stepped, and extended toward the center of the machine as shown clearly in Fig. 9, of the drawings, so as to compact the markings upon the record while permitting the extension of the racks to adapt them to the rest of the machine. The several type members and their actuating segmental racks referred to, will be specifically pointed out in the description of the detailed mechanism to which each belongs.

The recording mechanism proper consists of all the type members included in the machine, and an oscillating lever 72 having an impact face 73, which lever is pivoted at 74 upon the frame 75 which frame carries the hammer mechanism and all parts of the machine incidental to the storage and feeding of the record strip and the ribbon feed and reverse mechanism. The frame 75 is slidably mounted upon rods 76 by means of curved feet 77 at the ends of said frame. The short arm of the lever 72 is provided with an anti-friction roller 78 adapted to be engaged by the rise 79 upon the cam 80 (see Fig. 6). Carried by the frame 75 are standards 81 adapted to receive a reel of the record strip 82, said frame being provided with guide rollers 83, 84 about which the strip 82 passes to the feed rollers 85 and 86 mounted in the frame 87, said rollers being made of resilient material and being actuated by a pawl and ratchet mechanism 88 which is operated by the oscillations of the hammer lever 72 as clearly shown in Fig. 24. The pressure upon the record strip passing between the rolls 85 and 86 is controlled by the spring 89 under the control of the adjustment screw 90. (See Fig. 22). Beyond the rollers 85 and 86 is a hollow drum 91 having extending at a tangent from said drum a bell-shaped mouth 92 the center of which mouth is tangential to the rollers 85 and 86 at their point of contact, the strip 82 being pushed by said rolls into said bell shaped mouth and automatically coiled within the drum 91. Pivoted eccentrically of and at one side of the drum 91 is the first of a train of gears 93, meshing with the gears driving the feeding rollers 85 and 86, which gear carries a plurality of diametrically oppositely disposed pins 94 and 95 adapted to be alternately engaged by a tappet 96 mounted upon a shaft extending axially of the drum 91, thus causing, by reason of the eccentricity of the bearings of the first of the train of gears, and of the tappet 96, a half revolution of the first of said train at each complete revolution of the said tappet, when actuated by the handle 97. The rotary shaft carrying the tappet 96 also carries a second and longer tappet 98 adapted to actuate the shears, at the end of each complete revolution of the handle 97 thus causing the rotation of said handle to first feed the record strip into the drum 91 a predetermined length to bring the entire printed record within said drum and then cut the strip so as to permit the removal of the printed record without disturbing the threaded unprinted record strip, and leaving the machine in its operative position, so that a subsequent record may be made without rethreading the record strip through the machine. The tappet 98 is set on its shaft so as not to engage either pin 94 or 95, the sole function of such tappet being to actuate the shears. The shears consist of a movable blade 99 and a fixed blade 100 carried by the top edge of the bell mouth 92.

In actuating the shears, the tappet 98 engages the projection 101 connected to the movable shear blade 99. Particular reference is had, in describing this mechanism, to Fig. 6 of the drawings, the handle 97 turning to the left of said view in separating the printed strip from the unprinted.

The feeding movement of the record strip 82 is radially of the axis of the type members, and the impact surface 73 of the hammer mechanism is of a width sufficient to engage all of the type members.

Figure 22:
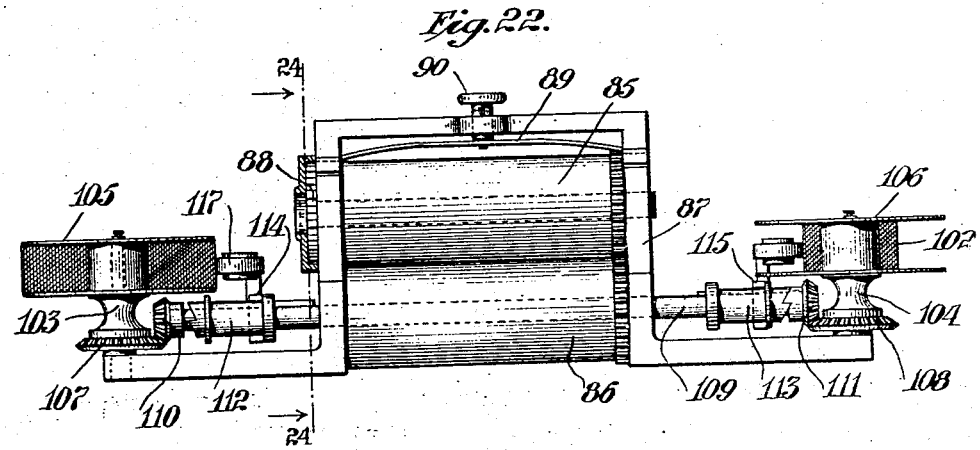
Figure 23:
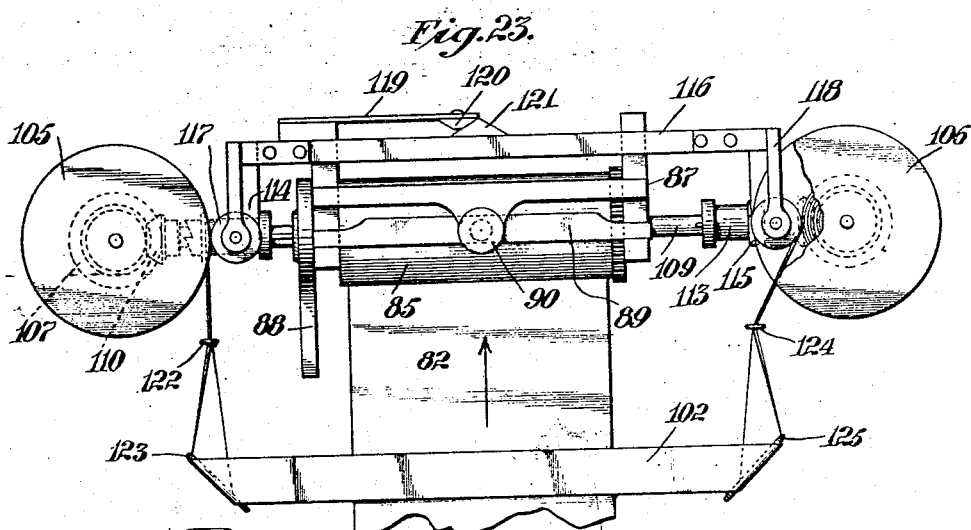

The printing ribbon 102 at the printing point extends laterally of the machine across the face of all of the printing members, and the mechanism controlling the feeding movement thereof is clearly shown in Figs. 22 and 23 of the specification and will now be referred to.

Mounted upon opposite sides of the frame 87 are spindles 103, 104 adapted to receive the ribbon spools 105, 106 which may be of any desired construction. Each spindle 103, 104 is provided with a bevel gear 107, 108, by means of which said spindles are rotated. The ends of the shaft 109 upon which the feed roller 86 is keyed, extends into close juxtaposition to the gears 107, 108 respectively, and rotatably mounted upon the opposite ends of said shaft are the small bevel gears 110, 111 in constant mesh with the bevel gears 107, 108 respectively. Either spindle 103, 104 is driven from this shaft 109, through such pinion when it is coupled to said shaft, said pinions being adapted to be alternately coupled in order to reverse the direction of the feeding movement. Splined upon the shaft 109 adjacent to each pinion 110, 111 are impact coupling sleeves 112 and 113 coöperating with clutch surfaces upon said pinions 110, 111. Each of the coupling members 112 and 113 have circular flanges adjacent to the opposite ends thereof and reciprocating between said flanges on the respective sleeves are the forks 114 and 115 carried by a laterally reciprocable carriage 116 supporting the rolls 117, 118 which are adapted to pass between the spool ends and engage the wound ribbon 102. This arrangement causes the frame 116 to be reciprocated to an extent determined by the quantity of ribbon accumulated upon a spool, the coupling sleeves 112, 113 being simultaneously actuated to disengage the coupling from the gears actuating the spool being wound, and engaging the coupling for gears actuating the spool at the other side of the printing mechanism. The clearance between the flanges upon the coupling members 112, 113 permits the said frame 116 to be moved to an extent approximating the increase in diameter of the completely wound spool before having any operative effect upon the coupling means.

To insure a positive coupling and uncoupling of the bevel pinions 110 and 111, I provide the frame 87 with a spring arm 119 carrying a double cam-like impact member 120 adapted to engage a double cam-like member 121 upon the frame 116, this spring 119 being tensioned through the movement of said frame 116 in either direction, and the coöperating cam surfaces 120 and 121 acting toward the conclusion of the winding operation upon one spool, to impart a slight lateral thrust to the frame 116 to accomplish or insure the final uncoupling of one bevel gear 110 or 111, and the final coupling of the other.

By this construction, it will be observed, the ribbon feed will be accomplished simultaneously with the feed of the record strip both feeds being automatic and that when the ribbon has been practically entirely unwound from one spool and wound upon the other, the direction of feed of the ribbon only will be automatically reversed by a positive mechanism, and that the interval of the reversing of feed will be governed solely by the quantity of ribbon previously fed. In this ribbon feed reversing mechanism the various gears are always in mesh, thus preventing any binding of parts; and the reversal of the direction of the feeding movement will be accomplished by the mechanism under the positive control of the ribbon being wound upon one of the spools.

Suitable guides 122, 123, 124 and 125 are provided for carrying the ribbon and turning it so that it will assume the proper position in crossing the type members. By means of these guides the ribbon is fed transversely of the direction of feeding movement of the record strip but simultaneously with such feeding movement thus insuring a clear sharp imprint with each actuation of the recording mechanism.

Mounted within the casing of the machine and above the racks 39 is a register or total adder adapted to be actuated when the machine is actuated to record a charge transaction. This total adder consists of a plurality of number wheels 126, 127, 128, and 129 rotatably mounted upon the same shaft and each having secured thereto and rotatable therewith a ratchet wheel 130 and a gear 131 the ratchet 130 coöperating with a locking member 132 the operation of which will be more fully referred to hereinafter and the function of the gear 131 being to drive the gear 133 upon a counter-shaft which gear 133 carries a single toothed gear 134 meshing with the Geneva gear 135 actuating through the pawl and ratchet mechanism 136, the next succeeding number wheel of higher denomination. This construction is clearly indicated in Fig. 5 of the drawings. The gears 131, 133, 134 and 135 and the pawl and ratchet mechanism 136 constitute the transfer mechanism. Each of the number wheels 126, 127, 128 and 129 has mounted adjacent thereto on its shaft a pinion 137 meshing with its rack 139, each of said pinions 137 meshing with its rack 139, each of said pinions 137 being coupled to its number wheel by a pawl and ratchet mechanism 138 (see Fig. 5) so as to permit the return movement of said rack without restoring the number wheel.

Each pinion 137 is normally disengaged from, and adapted to be engaged by, its rack 139, so as to permit any of the number wheels of higher denomination to be actuated either by means of its rack or by means of the transfer mechanism above referred to, the main actuating mechanism being so set as to register mechanism as to operate the number wheels under the control of said racks during successive stages and thus insure the completion of the transfer operation from one wheel to the other of next higher denomination before that wheel of higher denomination is itself actuated through its rack. To prevent the overrunning of any number wheel through momentum, or the return movement of any such wheel because of a binding of parts upon the return of the rack, I provide the ratchet wheels 130 and the locking member 132 adapted to hold the number wheel against movement in either direction, by reason of the reciprocation of its controlling rack 139 imparting an intermittent oscillatory movement to said member, alternately permitting the rotation and retardation of its number wheel to an extent governed by the quantity of reciprocatory movement of its rack, this means comprising a lever arm 140 attached to the locking member 132 which arm carries a stud 141 having oppositely disposed cam surfaces coöperating with a plurality of cam surfaces 142 upon the rack 139, the member 132 having similar faces and the teeth of the ratchet 130 co-inciding with the cam surface upon said rack. By this construction, the member 132 is forced by means of the spring 143 into engagement with the wheel 130 the rotation of said wheel tending to lift said member out of such engagement, such lifting being resisted by the rack 139, or the apices of the cam surfaces 142, the depressions between said apices permitting the elevation of said locking member to release its number wheel. The similarity of the configuration of the wheel 130 and the surfaces 142 permits that synchronous action necessary to accomplish the feed of the number wheel under its rack while the slight locking interval of said member positively prevents the overrunning of the number wheel, the slight interval of the locking action not interfering with the free movement of the number wheel under its rack. Upon the return movement of the rack the friction between the wheel 130 and the member 132 will be sufficient to overcome any binding of parts between the pinions 137 and the pawl and ratchet connection between it and the number wheel. Each of the four lower denominational number wheels or each wheel adapted to be actuated directly by a reciprocating rack 139 is equipped with a locking member of this character, the number wheels 144 to the left of the wheel 129 being merely additional wheels actuated by transfer mechanisms for extending the total adder to the desired denomination, the number of such wheels being capable of multiplication indefinitely as desired.

The racks 139 are normally reciprocated with the racks 39 so as to add to the totals shown upon the register, the amount of each charge transaction recorded, thus securing by a single operation of the machine the recording of each transaction and the addition of all charge transactions upon the total adder so that at any time a dealer may determine the volume of his charge business during any desired interval, as weekly or monthly. When, however, it is desired to record some transaction other than a charge transaction upon the recording strip 82, it is necessary to provide means whereby the register or total adder may be thrown out of gear with, or disconnected from, the recording mechanism so that the amount recorded upon the record strip will not be added to the total of said register. This means preferably consists of a latch member 145 pivotally mounted upon the rack 139 and adapted to engage the raised end 146 of the rack 39, this latch member when in the lowered position coupling or locking the racks 139 and 39 together so as to have them move as a unitary rack while permitting the disconnection or uncoupling of the two racks to permit the rack 39 to move alone. Each latch member 145 is provided with a short arm 145ᵃ adapted to be engaged by the cam riser 147 on a shaft 148 extending transversely of the machine, said shaft being provided with a gear wheel 149 in mesh with a rack 150 controlled by the special account key 151 (see Fig. 1). This rack 150 is in mesh with a segmental rack 152 actuating the type member 153 so that with the actuation of the special transaction key 151, the racks 139 and 39 will be automatically uncoupled by disconnecting the rack 139 and throw the register out of gear and at the same time, the type member 153 will be set so as to have appear upon the record the nature of the transaction thus recorded. The member 153 may have a plurality of different types thereon indicating goods sent "C. O. D.," goods "returned," "cash sales," "credits," or "payments on account," the nature of the record being determined by the quantity of movement of the special transaction key 151. The riser 147 is so proportioned and arranged that the minimum movement of the key 151 will accomplish the uncoupling of the racks 139 and 39 by raising the latch 145 and hold this latch in the raised position during the subsequent movement of the gear 149 when determining the character on the type member 153 to appear in the printing position. The rack 150 is under the control of a spring 154 a rack bar 155 having double cam surfaces coöperating with an oppositely beveled foot upon the special transaction key 151 holding said rack in any adjusted position, while permitting the free movement of the rack by the operator to correct any mistakes which may occur in the setting of the type member 153. The rack bar 155 is similar in all other respects to the ratchet bar 24, being pivoted at the same point under control of a similar spring and capable of being depressed by the lever member 34 to release the special transaction key upon the completion of the operation of the machine.

Adjacent to the rack bar 155 are a plurality of bars 156 each of which serves to lock an account number key 157, 158 or 159 in its adjusted position when setting the recording mechanism to indicate the number of the account in which a charge is being made. Each said key 157, 158 or 159 is connected to a rack 160, 161 or 162, controlled by springs 163, 164 and 165 respectively, normally tending to restore the key to normal when released by the depression of the racks 156 by the lever 34. The racks 160, 161 162 are in mesh respectively with the segmental racks 166, 167, 168 actuating type members 169, 170 and 171 (see Fig. 9), in the printing mechanism.

All of the mechanisms heretofore described excepting the printing mechanism are operated in setting the machine, the actual making of a record, and the restoration of these parts to normal being accomplished by means of a main actuating mechanism which will now be described.

The main actuating mechanism comprises a series of cams mounted upon the shaft 32 and may be rotated by means of the handle 172 exposed exteriorly of the machine which handle is connected to said shaft by means of the entrained gears 173 and 174 the first of which preferably is of one half of the diameter of the second so as to require two full revolutions of the operating handle to accomplish one full rotation of the main actuating mechanism in order to insure ease in the operation of the machine. In addition to the cams 33 and 80 respectively cutting to the cams 33 and 80 respectively actuating the releasing lever 34 and actuating the hammer 72, and carrying the lock pin 31 all of which are keyed to said shaft 32, are a plurality of grooved cams 175, 176, 177 and 178 (see Figs. 6, 15, 16 and 17) the grooves in which are so formed as to oscillate the levers 68 successively, each of said levers receiving its full throw before the other is started. This arrangement not only reduces the force required to turn the crank 172 but at the same time, inasmuch as the reciprocation of the racks 39 and 139 are under the control of these levers, positively prevents the simultaneous rotation of any number wheel by said racks and by the transfer mechanism thus insuring absolute accuracy in the total adder.

Each of the cams 175, 176, 177, 178 carries a projection 179, 180, 181 and 182 adapted to engage one arm of a bell crank lever 183, the other arm of which is pivoted to its detent plates 54 so that with the completion of one full rotation of said cams, all of said detent plates will be simultaneously reciprocated to release the depressed keys and restore the key board to normal. The grooves in the cams 175, 176, 177, 178 are so cut as to give both a direct and return throw to each of the lever arms 68 providing that slight interval of rest during which the hammer mechanism is actuated by the cam 80. It will thus be observed that the main actuating mechanism is all contained upon a single shaft thus insuring the synchronous actuation of all mechanically operated parts, and avoiding any possibility of a collision of parts and at the same time insuring a timely reciprocation of all parts to normal preparatory to the next operation of the machine. The various parts are so constructed and arranged that the quantity of movement of the main actuating mechanism and of the parts under the control of the same, remains constant, irrespective of the amount being recorded, thus insuring uniformity in the working conditions of the machine and not only avoiding likelihood of damage, such as might occur were the operative moment of the main actuating mechanism variable, but minimizing wear and insuring ease in the operation of the machine.

Various refinements of adjustment may be incorporated in the mechanism of the machine to facilitate assembling and compensate for wear, the adjustable screw 43 in the adjustment boxes 44 being for the purpose of permitting the nice adjustment of the quantity of rotary movement of the coupling member 61, and the levers 68 each being provided with a roller 184 adapted to enter the slot in its cam 175, 176, 177 or 178 mounted upon a frame 185 attached to the lever 68 by means of the screw 186 permitting the adjustment of said roller toward and from the shaft 32 to take up wear and thus accurately determine the throw of said lever under the control of its cam.

The operation of the herein described machine is substantially as follows:—In describing the operation of the machine, I will follow the action of a clerk in one transaction, explaining the effect of these actions upon the mechanisms of the machine, as such method of description will bring out clearly, not only the operation of the machine, but the purposes thereof. Assuming that a purchaser has ordered goods of a certain value, which are to be charged to his account, the clerk first enters autographically upon an ordinary or special form of charge slip, the various items ordered and the value of same, totaling the amount of the charge; and in case of a running account, adding this total to the previous debit balance of the purchaser. These charge slips will ordinarily be made in duplicate so that one copy can be delivered with the goods, the other copy being preserved, as a book-keeper's entry, by the dealer. The clerk thereafter records this transaction upon the machine in the following manner, the machine being normally locked against operation by the lever 27 in the manner above described. The clerk first draws the identification key 18 toward him until the said key is so located as to indicate the identifying mark of that clerk, the reciprocation of said key drawing the rack 19 forwardly, oscillating the type member 35, by means of the segmental rack 36, until the type identifying that clerk is in the printing position. The forward movement of the lever 19 also disengages the cam 20 from the swinging bolt 17 permitting said bolt to drop by gravity out of engagement with the lock plate 16 thus releasing the frame 15. As the key 18 is drawn forwardly, the spring pawl 23 carried thereby passes over the ratchet bar 24, either said pawl or said bar yielding, under their respective springs, to permit this movement; the engagement of the said racks and said pawl preventing the return movement of the lever 19. This construction places the relocking of the machine entirely without the control of the operator, except through the operation of the machine in making a record, thus making it necessary to operate the machine after it has once been released before the file drawers can be relocked. The clerk then draws the keys 157, 158 and 159 forwardly, the racks 156 being depressed against the tension of their springs to permit this movement, the said keys being positioned so as to indicate the number of the account in which the charge is to be made. This forward movement of the keys 157, 158, and 159 reciprocates the racks 160, 161 and 162 thus setting the type members 169—170—171, by means of the segmental racks 166, 167 and 168 to have the type members corresponding with the numbers set, appear in the printing position. The racks 156, and ratchet 24 hold the racks 160, 161, 162, and 19 respectively in this position, the springs tending to normally restore said racks being placed under tension by the movement of the keys controlling same. Thereafter, assuming that the charge did not exceed $99.99, the keys 46 corresponding in denomination and value with the figures of the total are depressed, the depression of these keys setting the mechanism interposed between the key board and the printing mechanism, (which mechanism is under the control of the main actuating mechanism) so that by the subsequent operation of this main actuating mechanism the number type members and the total adder or register are set to record the total of this transaction and add it to the total charge transactions during a given period up to that time. The operative effect of the depression of one of these keys is the same as any other so that the result of such depression will be described as to one key only, it being further pointed out specifically how the operation of different digit keys in a series will accomplish the variable adjustment of said interposed mechanism.

As any key 46 of a series is depressed, the rack on the stem 47 thereof rotates its pinion 45, the number of teeth on said rack and pinion being such as to rotate the latter 324 degrees with each full depression of the key, the quantity of movement of all keys being the same. The pinion 45, being idle upon the shaft 41, the rotative movement of this shaft will be governed by the interval of initial engagement of the tongue 44 on said pinion with the abutment 43, in the adjustment box 42, the subsequent movement of said pinion, turning said box, and with it the shaft 41. It will thus be observed that the degree of rotation of the shaft 41 is determined by the lost motion between the tongue 44 and the abutment 43. If the said tongue is in normal engagement with said abutment, the shaft 41 will be turned $\frac{9}{10}$ of a revolution, setting the coupling member 61 in a position where it will impart such a movement to the rack 39 as to set the type member 37 with "9" in the printing position when the main actuating mechanism is operated. If the tongue 44 is set 108 degrees from the abutment 43, there will be a lost motion between these two members corresponding with the distance between these two parts, thus causing the complete depression of the key to rotate the shaft 41 only $\frac{6}{10}$ of a revolution, the quantity of movement varying with the position, as above stated, of these two parts. This differential movement of the shaft 41 under the control of a single series of digit keys, insures absolute accuracy in the key board mechanism and avoids both complication of structure and any possible interference or collision between the various parts. As any key is depressed, the laterally projecting pin thereon engages the beveled surface 55 of the detent plate 54 reciprocating said plate sufficiently to permit said pin to enter the horizontal slot 57, whereupon the spring 58 forces said detent plate to its normal position and locks the key in its depressed position, thus indicating clearly on the key board what number has been set up. The detent plate 54, however, is free to be actuated by any other key in the series so that if the wrong digit is set up, it may be released and the proper one substituted by merely depressing the proper key, the forward reciprocation of the plate 54 permitting the escape of any depressed key. As the shaft 41 is rotated, it rotates the pinion 51 which in turn forces the rack 52 downwardly against the spring 53, thus not only offering sufficient resistance to the rotation of the shaft 41 to avoid any possibility of its overrunning under momentum, but also tensioning the spring 53 so that it will restore the shaft 41 to normal after the machine has been operated, the engagement of the tongue 44 and the abutment 43 controlling the movement of operation of said spring 53, through the detent plate 54 and the key shank 47. If a key in a series is depressed when no number of that denomination is desired, thus making it impossible to justify by the depression of another key in that series, the justification key 59 may be pressed inwardly, oscillating the lever 60 to draw the detent plate 54 forwardly until the keys in that series have been released, the spring 53 and plunger rack 52 immediately restoring the shaft 41 and the coupling member 61 to the normal or zero position. The stop 50 engaging the lower portion of the frame 40, limits the upward movement of the keys 46 under their springs 48, the sole function of these springs 48 being to elevate the said keys 46.

It will be observed that in this key board construction there is a substantially constant load upon each key, and a uniform movement thereof, the only reaction or kick possible upon the keys being due to the interval at which the load of the shaft 41 is taken up by the pinions 45, which load is so light as to be hardly perceptible.

When the clerk has done all of the things heretofore specified, the type members under the control of the identification key and the account keys will be set, and the mechanism for setting the amount numbers in the type mechanism will be set, although neither the register nor the total adder, nor the said number segments will have themselves been actuated. Thus the machine will be set ready for operation without having accomplished any actual making of a record, and while the main actuating mechanism is still locked by the lever 27. While in this position all of the members, excepting the identification key may be manually restored to normal to correct any mistakes, so that although a record of no account may be printed, some transaction must appear upon the record with the identification mark of the clerk making the same before all parts can be restored to normal.

The clerk having set the machine properly, any of the drawers, or any number of such drawers, may be drawn out until the drawer containing the file compartment corresponding in number to that indicated by the keys 157, 158 and 159 is exposed, all covers 8, in said drawer, however, being closed so as not to expose the contents of any compartment. The clerk may, by releasing the latch 9 of the compartment corresponding with the number set, permit the cover 8 to spring upwardly to permit access to such file. The autographic record of the transaction is then placed in this compartment.

As any drawer 1 is drawn outwardly, it will, by means of the toggle levers 3, force the extensions 11 rearwardly of the machine, forcing the lock rods 10 rearwardly, which rods through the arms 12 oscillate the segmental racks 14 and draw the frame 15 rearwardly of the machine the bolt 17 having been disengaged from its socket by the reciprocation of the rack 19 in the manner above referred to so as to permit this movement of the rack. As the said frame 15 is forced backwardly, it carries with it the rod 26 which in turn oscillates the rocking lever 27 in a manner to cause the lower arm 29 to disengage the lock pin 31 on the disk carrying same, keyed to the shaft 32. This oscillation of the lever 27 releases the shaft 32 and permits the free rotation of the main actuating mechanism of which this shaft is a part. The various drawers being thus unlocked and the main operating mechanism thus released, it is impossible to lock any drawer excepting by the operation of the main actuating mechanism. The clerk thereupon turns the handle 172, which through the gears 173 and 174 turns the shaft 32 one complete revolution with two revolutions of said handle. As the shaft thus rotates it carries with it all of the cams and disks accomplishing the actuation of the printing mechanism and the restoration of the various parts to normal, or the releasing of such parts to permit them to automatically return to normal.

As the shaft 32 is rotated, the cams 175, 176, 177 and 178 operate successively upon the levers 68 associated with the several sets of digit keys, the initiation of the operation of one lever being only after the complete throw of the preceding one. As each lever 68 reciprocates under its cam toward the rear of the machine, the coupling member 61 slides upon the shaft 41 rearwardly of the machine and carries the racks 39 and 139 with it, the quantity of movement of said racks being governed by the moment of engagement of the impact coupling formed by the graduated recesses in said coupling member 61 and the pin 63 on its rack, the quantity of movement of said racks being governed by the quantity of lost motion between said members of the impact coupling. Hence the rotation of the shaft 32 may accomplish the differential movement of the several racks 39 and 139 through a member having a fixed quantity of movement, the extent of movement of said racks being defined or governed by the key board mechanism. As the racks 39 are moved, they oscillate the printing members 37 through the segmental racks 38 and thus set the number types to show the amount indicated by the key board. The movement of the rack 39 when a charge transaction has been recorded, results in a similar movement of the rack 139 through the latch member 145, thus accomplishing, simultaneously with the setting of the amount type members, the actuation of the register or total adder in the manner referred to in the description of this mechanism. The transfer mechanism of this register will carry from one number wheel to the next in the manner described, the successive operation of the racks and the manner of timing the initiation of the operative movement of each, insuring absolute accuracy in this carrying operation, the locking member 132 preventing any possible loss of accuracy by the overrunning of the number wheels. With the continued rotation of the shaft 32, the pin 31 engages the arm 30 of the lever 27, forcing said lever to its normal locking position, said pin when this lever is in this position, passing under the said arm so as to complete its rotation and come to rest in engagement with the locking arm 29 of said lever. As the lever 27 is rocked forwardly, it draws the frame 15 forwardly through the rod 26, thus oscillating the racks 14 and the arms 12 in a manner to cause the locking bars 10 to engage the extensions 11 of the lever system 3 of any drawer, and through said lever system close the drawer, the rods 10 by their continued engagement with said extensions 11, locking not only the drawer closed, but every other drawer in the filing cabinet. It will be observed that this locking mechanism is therefore common to all of the filing devices. Thereafter and toward the end of the revolution of the shaft 32, the riser 79 on the cam 80 engages the roller 78 carried by the short arm 77 of the hammer member 72, raising said member and simultaneously setting the feeding mechanism for the record strip and the ink ribbon 102 preparatory to the actual making of the record, the actual making of the record being accomplished at the end of the hammer stroke. As the riser 79 passes the lever 78, the riser on the cam 33 engages the lever 34, and through it depresses all of the racks 24, 155 and 156, thus releasing any of the keys 18, 151, 157, 158 and 159 which may have been set for that operation of the machine, said keys being restored to normal through the springs acting upon the racks 19, 150, 160, 161 and 162, the restoration of said racks restoring the various type members under their control to normal. Substantially simultaneously with the actuation of the lever 34 all of the levers 68 are given a return throw carrying all the racks 39 and with them the racks 139 to normal through the return movement of the coupling member 61 and the engagement of the pin 63 with the rear surface of the groove 70, the restoration of these racks to normal being by a reversal of the differential movement. As the various cams 175, 176, 177 and 178 approach the end of their rotation, the pins 179, 180, 181 and 182 thereon engage respectively the bell crank levers 183 connected to the several detent plates 54 and thrust these plates forwardly to release any depressed keys.

Figure 24:
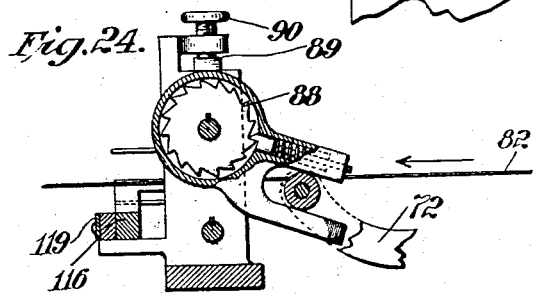

The return movement of the hammer 72 causes the simultaneous feeding of the record strip and the ink ribbon through the pawl and ratchet mechanism 88 (see Fig. 24). The detailed construction of the ribbon reverse mechanism has been fully described heretofore and will not again be entered into. As the record strip 82 is fed forward, it is thrust by the feed rollers 85 86 directly into the bell shaped mouth 92 so that it automatically coils itself within the drum 91 thus dispensing with the necessity for any rewinding mechanism, for the record strip and at the same time eliminating that pressure which might result in an offset in the record itself.

With the sequence of operations above described, it will be observed that a complete record is made of each transaction and that with the completion of the record the entire mechanism is restored to its normal, locked position, and that the mechanism cannot be again operated until a file drawer has been opened; and that the file drawer cannot be opened until the identification key has been set so as to disclose upon the record which clerk operated the machine. The use of the account keys insures an identification of the charge in which an account is made and permits the shop keeper to absolutely check up his charge accounts from the record.

To permit the speedy removal of the record, I provide the mechanism for positively feeding the record strip within the drum 91 to an extent sufficient to include all recorded transactions and automatically sever the strip beyond the feed rolls so as to leave the machine threaded for subsequent operation. This manual feeding of the strip is accomplished by means of the handle 97 of gear train 93, the tappets 96 and the pins 94, 95 upon the first of the gear train 93. As the said crank is turned to the left the tappet 96 engages the pin 95 turning the first of the gear train 93 a half revolution and transmitting a sufficient quantity of rotary movement to the rollers 85, 86 to feed the record strip 82 forward sufficiently to have the last recorded number clear the end of the bell mouth 92. The tappet 96 at the end of the half revolution of the first of the gear train 93 passes under the pin 95 and the shaft carrying said tappet and the tappet 98 by its continued rotation causes the last named tappet to engage the heel 101 of the movable shear blade 99, resulting in the severance of the strip forwardly of the bell mouth 92. The strip may thus readily be removed from the drum 91 to permit the checking of same with the files of autographic records. If, however, the transaction is other than the mere making of a charge in some specific account, (of a character as hereinbefore specified) the nature of this special transaction may be recorded upon the strip 82 with the proper marks of identification, and the sum of these transactions excluded from the register or total adder by merely reciprocating the special transaction key 151 which through the reciprocation of its rack 155 will simultaneously set the type segment 153 through the segmental rack 152 to indicate the nature of the transaction. As several transactions may thus be recorded by a different quantity of movement of the rack 150 the means for throwing the register out of gear with the main actuating mechanism is necessarily such as to have this effect irrespective of the quantity of movement of the rack 150. As the rack 150 is drawn forwardly, it rotates the gear 149 which in turn rotates the shaft 148 carrying the cam disks 147 which by their engagement with the short arm 145ᵃ of the latch member 145 simultaneously raise all of these couplings and hold them in the raised position irrespective of the quantity of movement of the key 151. When said coupling members 145 are so raised, the rack 39 reciprocates without having any effect whatever upon the rack 139 thus permitting the actuation of the type members without actuating the register or total adder. This results in the transaction appearing on the record, but not upon the register. The various cam plates 147 and latch members 145 are restored to normal by the spring of the rack 150, after the completion of one cycle of operations of the machine when the rack 39 has been restored to normal, and in the proper position relative to the rack 139 to accomplish the recoupling of said racks. When the register is thus thrown out of gear, the actuation of all other parts of the machine is the same, as heretofore described, so that access may be had to any of the filing compartments for the purpose of completing the autographic record of any account, the same as though a charge entry were being made.

My invention in its broader aspects is not limited to the details of construction shown in the accompanying drawings, it being apparent that such details may be departed from without departing from the spirit and scope of the invention. While a machine of this character possesses some of the characteristics of both an ordinary adding machine or an ordinary register, it differs therefrom essentially in its structure, function and mode of operation, being especially designed and constructed to meet conditions and to cover a field not contemplated by either of said other mechanisms and the invention is directed to those features specially adapting the machine to its peculiar conditions of use. It is not my intention, however, to limit the use of the various sub-combinations contained in the machine to application to this specific type of machine, it being apparent that such sub-combinations may be used in connection with analagous mechanisms not having all of the characteristics of a register of the species to which I have especially applied them.

Having described the invention, what I claim as new, and desire to have protected by Letters Patent, is:—

1. In a register, the combination with a printing mechanism including therein a type member and actuating means therefor, of a filing device, means normally locking same, an identification key, means actuated by said identification key to set a type member in said printing mechanism, and to make said locking means inoperative, and means actuated by said actuating means whereby with each actuation thereof, said identification key will be restored to normal and said filing device will be closed and locked.

2. In a register, the combination with a printing mechanism including therein a type member and actuating means therefor, of a filing device, means normally locking same, an identification key, means actuated by said identification key to set a type member in said printing mechanism, and to make said locking means inoperative, means actuated by said actuating means whereby with each actuation thereof, said identification key will be restored to normal and said filing device will be closed and locked, and means actuated by the opening of said filing device whereby said main actuating means is locked until said filing device is opened.

3. In a register, the combination with a printing mechanism including therein a type member and rotatable actuating means therefor, of a filing device, means normally locking same, an identification key, means actuated by said identification key to set a type member in said printing mechanism, and to make said locking means inoperative, means whereby said identification key is held in an adjusted position, and means actuated by said actuating means whereby with each rotation thereof, said identification key will be restored to normal and said filing device will be closed and locked.

4. In a register, the combination with a printing mechanism including therein a type member and rotatable actuating means therefor, of a filing device, means normally locking same, an identification key, means actuated by said identification key to set a type member in said printing mechanism, and to make said locking means inoperative, means whereby said identification key is held in an adjusted position, means actuated by said actuating means whereby with each rotation thereof, said identification key will be restored to normal and said filing device will be closed and locked, and means actuated by the opening of said filing device whereby said main actuating means is locked until said filing device is opened.

5. In a register, the combination with a printing mechanism embodying therein an identification type member, a rack acting thereon to set same, and actuating means for said printing mechanism, of a filing device, means normally locking same, a key rack adapted to engage the rack of said identification type member, an identification key connected with said key rack, means carried by said key rack coöperating with the locking means for said filing device whereby the movement of said rack will make said locking means inoperative, means adapted to close said filing device and means actuated by said first mentioned actuating means whereby with each actuation thereof, said identification key will be restored to normal and said filing device will be closed and locked.

6. In a register, the combination with a printing mechanism embodying therein an identification type member, a rack acting thereon to set same, and actuating means for said printing mechanism, of a filing device, means normally locking same, a key rack adapted to engage the rack of said identification type member, a spring normally acting to restore said key rack to normal, means holding said key in its adjusted position, an identification key connected with said key rack, means carried by said key rack coöperating with the locking means for said filing device whereby the movement of said rack will make said locking means inoperative, means adapted to close said filing device and means actuated by said first mentioned actuating means whereby with each actuation thereof, said identification key will be restored to normal and said filing device will be closed and locked.

7. In a register, the combination with a printing mechanism, and actuating means therefor, of a filing device, means adapted to positively close, and to lock same in the closed position, means whereby the movement of said last mentioned means may be prevented, a key controlling said last mentioned means, and means actuated by said first mentioned actuating means whereby, with each actuation thereof, said key will be restored to normal and said locking means will be actuated to close said filing device and lock it in the closed position.

8. In a register, the combination with a printing mechanism, and actuating means therefor, of a plurality of filing devices, means common to all such adapted to positively close, and to lock same in the closed position, means whereby the movement of said last mentioned means may be prevented, a key controlling said last mentioned means, and means actuated by said first mentioned actuating means whereby, with each actuation thereof, said key will be restored to normal and said locking means will be actuated to close said filing device and lock it in the closed position.

9. In a register, the combination with a printing mechanism and actuating means therefor, of a filing device slidably mounted in a casing, an oscillating locking member, means carried by said filling device and adapted to be engaged by said member whereby the movement of said device will oscillate said member in one direction and the return oscillation of said member will close said device, a bolt mechanism controlling said locking member, a special key controlling said bolt member, and means actuated by said first mentioned actuating means whereby said filing device will be normally closed and locked, will be capable of release by said special key, and will be automatically closed and locked by the actuation of said last named means.

10. In a register, the combination with a printing mechanism and actuating means therefor, of a filing device slidably mounted in a casing, an oscillating locking member, a lever system pivoted to said casing and having one lever thereof pivoted to said filing device and being provided with an extension adapted to be engaged by said locking member, whereby the movement of said device will oscillate said member in one direction and the return oscillation of said member will close said device, a bolt mechanism controlling said locking member, a special key controlling said bolt mechanism and means actuated by said first mentioned actuating means whereby said filing device will be normally closed and locked, will be capable of release by said special key and will be automatically closed and locked by the actuation of said last named means.

11. In a register, the combination with a printing mechanism and actuating means therefor, of a filing device slidably mounted in a casing, an oscillating locking member, a reciprocating frame, connections between said reciprocating frame and said locking member, a lever system pivoted to said casing and to said filing device and adapted to be engaged by said locking member whereby the movement of said device will oscillate said member and said reciprocating frame in one direction and the return oscillation of said frame and said member will close said device, an oscillating bolt adapted to engage said frame, a special key controlling said bolt and means actuated by said first mentioned actuating means whereby said filing device will be normally closed and locked, will be capable of release by said special key and will be automatically closed and locked by the actuation of said last named means.

12. In a register, the combination with a printing mechanism and actuating means therefor, of a filing device slidably mounted in a casing, an oscillating locking member, a reciprocating frame, connections between said reciprocating frame and said locking member, a lever system pivoted to said casing and to said filing device and adapted to be engaged by said locking member whereby the movement of said device will oscillate said member and said reciprocating frame in one direction and the return oscillation of said frame and said member will close said device, an oscillating bolt adapted to engage said frame, a special key controlling said bolt, means under the control of said frame whereby said main actuating mechanism is normally locked against movement and is released through the oscillation of said frame when the filing device is open, and means actuated by said first mentioned means whereby said frame is given a return reciprocation to automatically close and lock the filing device.

13. In a register, the combination with a printing mechanism and actuating means therefor, of a filing device slidably mounted in a casing, an oscillating locking member, a reciprocating frame, connections between said reciprocating frame and said locking member, a lever system pivoted to said casing and to said filing device and adapted to be engaged by said locking member whereby the movement of said device will oscillate said member and said reciprocating frame in one direction and the return oscillation of said frame and said member will close said device, an oscillating bolt adapted to engage said frame, a special key controlling said bolt, said actuating means for the printing mechanism embodying therein a rotary stud, an oscillating lever having two arms, one of which is normally projected in the path of said stud to lock said actuating mechanism and the other of which is projected in the path of said stud when said lever is actuated to restore said lever to its normal locking position, and a connection between said lever and said frame whereby the machine is locked after each actuation thereof and is normally maintained in the closed and locked position throughout.

14. In a register the combination with a printing mechanism and actuating means therefor, of a plurality of superposed sliding file drawers mounted in a casing, an oscillating locking member common to all of said drawers, a reciprocating frame, connections between said reciprocating frame and said locking member, each of said drawers being provided with a lever system pivoted to said casing and to said drawers respectively and adapted to be engaged by said locking member whereby the movement of said device will oscillate said member and said reciprocating frame in one direction and the return oscillation of said frame and said member will close said device, an oscillating bolt adapted to engage said frame, a special key controlling said bolt and means actuated by said first mentioned actuating means whereby said filing device will be normally closed and locked, will be capable of release by said special key and will be automatically closed and locked by the actuation of said last named means.

15. In a register, the combination with a printing mechanism and actuating means therefor, of a plurality of superposed sliding file drawers mounted in a casing, an oscillating locking member common to all of said drawers, a reciprocating frame, connections between said reciprocating frame and said locking member, each of said drawers being provided with a lever system pivoted to said casing and to said drawers respectively, and adapted to be engaged by said locking member, whereby the movement of any of said drawers will oscillate said member and said reciprocating frame in one direction and the return oscillation of said frame and said member will close said device, an oscillating bolt adapted to engage said frame, a special key having a cam thereon adapted to normally hold said bolt in the locking position and permitting the automatic release of said bolt, means restoring said key, and said bolt therethrough to normal, and means actuated by said first mentioned means whereby all of said drawers will be normally closed and locked, will be capable of release by said special key and any drawer will be automatically closed and locked by the actuation of said last named means.

16. In a register, the combination with a printing mechanism and actuating means therefor, of a plurality of superposed sliding file drawers mounted in a casing, an oscillating locking member common to all of said drawers, a reciprocating frame, connections between said reciprocating frame and said locking member, each of said drawers being provided with a lever system pivoted to said casing and to said drawers respectively, and adapted to be engaged by said locking member, whereby the movement of any of said drawers will oscillate said member and said reciprocating frame in one direction and the return oscillation of said frame and said member will close said device, an oscillating bolt adapted to engage said frame, a special key having a cam thereon adapted to normally hold said bolt in the locking position and permitting the automatic release of said bolt, a spring tending to normally restore said key, and said bolt therethrough to normal, a pivotal ratchet bar, a pawl carried by said special key, coöperating with said bar, means normally holding said bar and said pawl in operative engagement, a lever actuated by said first mentioned actuating means, an oscillating lever actuated by said first mentioned means for depressing said pawl to release said lever, a printing member in said printing mechanism controlled by said special key and means actuated by said first mentioned actuating means whereby all of said drawers will be normally closed and locked, will be capable of release by said special key and any drawer will be automatically closed and locked by the actuation of said last named means.

17. In a register, the combination with a printing mechanism and actuating means therefor, of a filing device, means normally locking same, means making said locking means inoperative and simultaneously setting a type member in said printing mechanism, a plurality of account keys, means actuated by said account keys to set type members in said printing mechanism to indicate in what account a transaction took place and means actuated by said actuating means whereby with each actuation thereof, said filing device will be closed and locked and said account keys will be restored to normal.

18. In a register, the combination with a printing mechanism embodying therein a plurality of type members having the digits indicated thereon, and actuating means for said printing mechanism, of a filing device, means normally locking same, means making said locking means inoperative, a type member rack controlling said type members, a plurality of account key racks and keys for actuating same, whereby said type members may be independently actuated to set up any desired number, to indicate in what account a transaction took place, and means actuated by said first mentioned actuating means whereby with each actuation thereof said filing device will be closed and locked, and said account keys will be restored to normal.

19. In a register, the combination with a printing mechanism embodying therein a plurality of type members having the digits indicated thereon, and actuating means for said printing mechanism, of a filing device, means normally locking same, means making said locking means inoperative, a type member rack controlling said type members, a plurality of account key racks and keys for actuating same, whereby said type members may be independently actuated to set up any desired number, to indicate in what account a transaction took place, each of said account racks being provided with a spring tending to normally restore same to normal, detent members for said racks respectively, whereby any rack will be held in its adjusted position, and means actuated by said first mentioned actuating means whereby with each actuation thereof said filing device will be closed and locked, and said account keys will be restored to normal, and said detent members will be actuated to permit said springs to restore said racks to normal.

20. In a register, the combination with a printing mechanism embodying therein a plurality of type members having the digits indicated thereon, and actuating means for said printing mechanism, of a filing device, means normally locking same, means making said locking means inoperative, a type member rack controlling said type members, a plurality of account key racks and keys for actuating same, whereby said type members may be independently actuated to set up any desired number, to indicate in what account a transaction took place, each of said account racks being provided with a spring tending to normally restore same to normal, oscillating detent members for said racks respectively, whereby any rack will be held in its adjusted position, a yielding means for normally holding said detents in engagement with their racks, said detents being so constructed as to permit the free movement of said members in either direction, and means actuated by said first mentioned actuating means whereby with each actuation thereof said filing device will be closed and locked, and said account keys will be restored to normal, and said detent members will be actuated to permit said springs to restore said racks to normal.

21. In a register the combination with a printing mechanism, and actuating means therefor, of a register or total adder, means actuating same simultaneously with the actuation of said printing mechanism, a special transaction key, means whereby the actuation of said key will simultaneously set a type member in said printing mechanism and make the means actuating said register inoperative, a filing device, means normally locking same, means making said locking means inoperative, means actuated by said first mentioned means, whereby, with each actuation thereof, said means actuating said register, said special transaction key and said printing mechanism will be restored to normal and said filing device will be closed and locked.

22. In a register the combination with a printing mechanism and actuating means therefor, of a register or total adder, means actuating same simultaneously with the actuation of said printing mechanism, a special transaction key, means whereby the actuation of said key will simultaneously set a type member in said printing mechanism and make the means actuating said register inoperative, said type member having a plurality of different emblems thereon, a rack whereby said member is actuated, a rack in mesh with said first mentioned rack, carrying a special account key, means holding said special account key in an adjusted position whereby the means making said register inoperative will be maintained in the operative position irrespective of the quantity of movement of the special account key, a filing device, means normally locking same, means making said locking means inoperative, means actuated by said first mentioned means, whereby, with each actuation thereof, said means actuating said register, said special transaction key and said printing mechanism will be restored to normal and said filing device will be closed and locked.

23. In a register, the combination with a printing mechanism embodying therein a plurality of number type members, set by means of rack members and actuating means for said rack members and for the printing mechanism in its entirety, of a register having a plurality of independently operative number wheels, a plurality of racks actuating same, means normally connecting said racks with the racks setting the number types whereby said racks are normally actuated simultaneously to operate said register and set said types, a special transaction key, means whereby the actuation of said key will simultaneously set a type member in said printing mechanism and make said means connecting said racks inoperative to permit the actuation of the printing mechanism without operating the register, a filing device, means normally locking same, means making said locking means inoperative, means actuated by said first mentioned means, whereby, with each actuation thereof, said means actuating said register, said special transaction key and said printing mechanism will be restored to normal and said filing device will be closed and locked.

24. In a register, the combination with a printing mechanism embodying therein a plurality of number type members, set by means of rack members and actuating means for said rack members and for the printing mechanism in its entirety, of a register having a plurality of independently operative number wheels, a plurality of racks actuating same, a latch member carried by each of said number wheel racks and adapted to engage said type wheel racks whereby said racks are normally actuated simultaneously to operate said register and set said types, a special transaction key, means whereby the actuation of said key will simultaneously set a type member in said printing mechanism and make said latches connecting said racks inoperative to permit the actuation of the printing mechanism without operating the register, means whereby the restoration of said special transaction key to normal will re-engage said latch members, a filing device, means normally locking same, means making said locking means inoperative, means actuated by said first mentioned means, whereby, with each actuation thereof, said means actuating said register, said special transaction key and said printing mechanism will be restored to normal and said filing device will be closed and locked.

25. In a register, the combination with a printing mechanism embodying therein a plurality of number type members, set by means of rack members and actuating means for said rack members and for the printing mechanism in its entirety, of a register having a plurality of independently operative number of wheels, a plurality of racks actuating same, a latch member carried by each of said number wheel racks and adapted to engage said type wheel racks whereby said racks are normally actuated simultaneously to operate said register and set said types, a special transaction key, means whereby the actuation of said key will set a type member in said printing mechanism, a shaft extending across all of said latch members, a gear on said shaft meshing with teeth on said last mentioned means, and a plurality of cams acting upon said latch members respectively to make said latch members inoperative to permit the actuation of the printing mechanism without operating the register, means whereby the restoration of said special transaction key to normal will reëngage said latch members, a filing device, means normally locking same, means making said locking means inoperative, means actuated by said first mentioned means, whereby, with each actuation thereof, said means actuating said register, said special transaction key and said printing mechanism will be restored to normal and said filing device will be closed and locked.

26. In a register, the combination with a printing mechanism and actuating means therefor, of a filing device, means normally locking same, an identification key, means actuated by said indentification key to set a type member in said printing mechanism and to make said locking means inoperative, a plurality of account keys, means actuated by said account keys to set type members in said printing mechanism to indicate in what account a transaction took place and means actuated by said actuating means whereby with each actuation thereof, said identification key will be restored to normal, said filing device will be closed and locked, and said account keys will be restored to normal.

27. In a register, the combination with a printing mechanism and actuating means therefor, of a register or total adder, means actuating same simultaneously with the actuation of said printing mechanism, a special transaction key, means whereby the actuation of said key will simultaneously set a type member in said printing mechanism and make the means actuating said register, inoperative, a filing device, means normally locking same, an identification key, means actuated by said identification key to set a type member in said printing mechanism and to make said locking means inoperative and means actuated by said first mentioned actuating means, whereby, with each actuation thereof, said means actuating said register, said special transaction key, said identification key, and said printing mechanism will be restored to normal and said filing device will be closed and locked.

28. In a register, the combination with a printing mechanism and actuating means therefor, of a register or total adder, means actuating same simultaneously with the actuation of said printing mechanism, a special transaction key, means whereby the actuation of said key will simultaneously set a type member in said printing mechanism and make the means actuating said register inoperative, a plurality of account keys, means actuated by said account keys to set type members in said printing mechanism to indicate in what account a transaction took place, a filing device, means normally locking same, an identification key, means actuated by said identification key to set a type member in said printing mechanism and to make said locking means inoperative, and means actuated by said first mentioned actuating means, whereby, with each actuation thereof, means actuating said register, said special transaction key, said identification key, said special account keys and said printing mechanism will be restored to normal and said filing device will be closed and locked.

29. In a register, the combination with a recording mechanism, of a filing device comprising a plurality of independently slidable file drawers, means retaining said drawers in a fixed position relative to said recording mechanism, means actuated by said recording mechanism for automatically and positively restoring any of said file drawers to the closed position, means normally locking said drawers in the closed position, and means controlling said locking means whereby said locking means are rendered inoperative prior to the actuation of said recording mechanism and are made operative with the actuation of said mechanism.

30. In a register the combination with a recording mechanism, of a plurality of independent casings each containing a plurality of independently slidable file drawers, means supporting said casings in a position fixed relative to said recording mechanism, means actuated by said recording mechanism, for automatically and positively restoring any of said file drawers to the closed position, means normally locking said drawers in the closed position, and means controlling said locking means whereby said locking means are rendered inoperative prior to the actuation of said recording mechanism and are made operative with the actuation of said mechanism.

31. In a register the combination with a recording mechanism of a plurality of independent casings each containing a plurality of independently slidable file drawers, means supporting said casings in a position fixed relative to said recording mechanism, all drawers included in the casing being connected to said casing by a lever system whereby the removal of any drawer from said casing is prevented, means actuated by said recording mechanism for automatically and positively restoring any of said file drawers to the closed position, means normally locking said drawers in the closed position, and means controlling said locking means whereby said locking means are rendered inoperative prior to the actuation of said recording mechanism and are made operative with the actuation of said mechanism.

32. In a register, a plurality of independently operative type members, actuating means coöperating with each of said type members respectively, a sequence of rotatable reciprocatory members, adapted respectively to differentially operate said actuating means, a keyboard comprising a plurality of sets of digit keys, connections between each set of digit keys and said rotatable reciprocatory member, whereby the actuation of different keys in said set will differentially rotate said member, said member being normally disengaged from said actuating means, and a main actuating mechanism common to all of said rotatable reciprocatory members, whereby after said member is set by said digit keys, it may be reciprocated to actuate said type setting member.

33. In a register, a plurality of independently operative type members, actuating means coöperating with each of said type members respectively, a sequence of rotatable reciprocatory members, adapted respectively to differentially operate said actuating means, a keyboard comprising a plurality of sets of digit keys, connections between each set of digit keys and said rotatable reciprocatory member, whereby the actuation of different keys in said set will differentially rotate said member, said member being normally disengaged from said actuating means, and said rotatable and reciprocatory member being adapted to be rotated to a variable extent by different keys, but to be reciprocated to the same extent with each actuation thereof, and a main actuating mechanism common to all of said rotatable reciprocatory members, whereby after said member is set by said digit keys, it may be reciprocated to actuate said type setting member.

34. In a register, the combination with a type member, a type member actuating means coöperating therewith, whereby said type member may be set in different positions, and a key board whereby the set position of said type member may be predetermined, of an interposed member under the control of said key board and normally disengaged from said actuating means, said interposed member having oppositely disposed impact surfaces thereon and said type member actuating means having a coupling member positioned between said surfaces whereby said means will be actuated by said interposed member to both set said type member and restore it to normal.

35. In a register, the combination with a type member, a type member actuating means coöperating therewith, whereby said type member may be set in different positions, and a key board whereby the set position of said type member may be predetermined, of a rotary shaft actuated by said key board, a coupling member slidably mounted thereon and rotatable therewith, said coupling being normally disengaged from said actuating means, and a main actuating mechanism acting upon said coupling member, whereby the type member is set through the actuation of said last named mechanism.

36. In a register, the combination with a type member, a type member actuating means coöperating therewith whereby said type member may be set in different positions, and a key board whereby the set position of said type member may be predetermined, of a rotary shaft actuated by said key board, a coupling member slidably mounted thereon and rotatable therewith, said coupling member being normally disengaged from said actuating means, and being provided with a plurality of longitudinal slots graduated in length whereby the interval of engagement of said coupling with said member will vary with a constant degree of reciprocation of said member, and a main actuating mechanism acting upon said coupling member, whereby the type member is set through the actuation of said last named mechanism.

37. In a register, the combination with a type member, a type member actuating means coöperating therewith whereby said type member may be set in different positions, and a key board whereby the set position of said type member may be predetermined, of a rotary shaft actuated by said key board, a coupling member slidably mounted thereon and rotatable therewith, said coupling member being normally disengaged from said actuating means, and being provided with a plurality of longitudinal slots graduated in length whereby the interval of engagement of said coupling with said member will vary with a constant degree of reciprocation of said member, and a slot in said coupling member extending forwardly circumferentially of said member and across said graduated slots, said type member actuating means having a coupling member projecting into said slot whereby said coupling member will both set said type member and restore it to normal, and a main actuating mechanism acting upon said coupling member, whereby the type member is set through the actuation of said last named mechanism.

38. In a register, the combination with a type member, a type member actuating means coöperating therewith whereby said type member may be set in different positions, and a key board whereby the set position of said type member may be predetermined, of a rotary shaft actuated by said key board, a coupling member slidably mounted thereon and rotatable therewith, said coupling member being normally disengaged from said actuating means and being provided with a plurality of longitudinal slots graduated in length whereby the member actuating means having a coupling with said member will vary with a constant degree of reciprocation of said member, and a slot in said coupling member extending forwardly circumferentially of said member and across said graduated slots, said type members actuating means having a coupling member projecting into said slot whereby said coupling member will both set said type member and restore it to normal, a block loosely mounted on said shaft and having a swivel connection with said coupling member, a lever pivotally connected to said block, and a main actuating mechanism acting upon said lever, whereby the type member is set through the actuation of said last named mechanism.

39. In a register, the combination with a printing mechanism embodying therein a type member, provided with a rack whereby it may be set, of a register or total adder, a bipart reciprocatory rack, one part of which is in mesh with said type member rack and the other part of which is adapted to actuate said register, means whereby said racks may be connected to operate simultaneously, or disconnected, at the will of the operator, and a main actuating mechanism imparting a differential movement to said racks together, or said rack in mesh with said type member rack.

40. In a register, the combination with a printing mechanism embodying therein a plurality of type members, each provided with a rack whereby it may be set, of a register or total adder embodying therein a plurality of number wheels rotatable independently and through a transfer mechanism, a plurality of racks, each of which is in mesh with one of said type member racks, and is adapted to actuate one number wheel of said register, a main actuating mechanism and means actuated thereby for imparting a differential movement to said racks successively, whereby said rack and said transfer mechanism cannot act at the same moment.

41. In a register, the combination with a printing mechanism embodying therein a plurality of type members each provided with a rack whereby it may be set, of a register or total adder embodying therein a plurality of number wheels rotatable independently and through a transfer mechanism, a plurality of racks, each of which is in mesh with one of said type member racks, and is adapted to actuate one number wheel of said register, a main actuating mechanism, means actuated thereby for imparting a differential movement to said racks successively, whereby said rack and said transfer mechanism cannot act at the same moment, and a plurality of independent mechanisms whereby said last mentioned means respectively may be set to have a predetermined operative effect when actuated by the main actuating mechanism.

42. In a register, a plurality of independently operative type members, actuating means coöperating with each of said type members respectively, a sequence of rotatable reciprocatory members, adapted respectively to differentially operate said actuating means, a keyboard comprising a plurality of sets of digit keys, connections between each set of digit keys and said rotatable reciprocatory member, whereby the actuation of different keys in said set will differentially rotate said member, said member being normally disengaged from said actuating means, and said rotatable and reciprocatory member being adapted to be rotated to a variable extent by different keys, but to be reciprocated to the same extent with each actuation thereof, a main actuating mechanism common to all of said rotatable reciprocatory members, whereby after said member is set by said digit keys, it may be reciprocated to actuate said type setting member, and means controlled by said actuating means whereby said rotatable reciprocatory member is restored to normal after each operation of said actuating means.

43. In a register, the combination with a type member, a type member actuating means coöperating therewith, whereby said type member may be set in different positions, and a key board whereby the set position of said type member may be predetermined, of a rotary shaft actuated by said key board, a coupling member slidably mounted thereon and rotatable therewith, said coupling being normally disengaged from said actuating means, a main actuating mechanism acting upon said coupling member, whereby the type member is set through the actuation of said last named mechanism, a pinion on said shaft, a spring pressed rack acting to normally restore said shaft to normal, means whereby said rack is held inoperative when said shaft is adjusted and means releasing said rack upon the actuation of said main actuating mechanism.

44. In a register, the combination with a type member, a type member actuating means coöperating therewith, whereby said type member may be set in different positions, and a key board embodying therein a series of digit keys whereby the set position of said type member may be predetermined, of an interposed member under the control of said key board and normally disengaged from said actuating means, adjustment means common to all of said keys in a series, for adjusting said interposed member, individual means coöperating with each key in a series, whereby said adjustment means may be differently adjusted by said keys, and a main actuating mechanism acting upon said interposed member whereby the type member is set through the actuation of said main actuating means.

45. In a register, the combination with a type member, a type member actuating means coöperating therewith, whereby said type member may be set in different positions, and a key board embodying therein a series of digit keys whereby the set position of said type member may be predetermined, of an interposed member under the control of said key board and normally disengaged from said actuating means, adjustment means common to all of said keys in a series, for adjusting said interposed member, individual means coöperating with each key in a series, whereby said adjustment means may be differentially adjusted by said keys, a detent member for holding any key in a series depressed to hold said interposed member in its adjusted position, means operated by the main actuating mechanism for releasing any depressed key, means restoring said adjustment means to normal when a depressed key is released, and a main actuating mechanism acting upon said interposed member whereby the type member is set through the actuation of said main actuating means.

46. In a register, the combination with a type member, a type member actuating means coöperating therewith, whereby said type member may be set in different positions, and a key board embodying therein a series of digit keys whereby the set position of said type member may be predetermined, of an interposed member under the control of said key board and normally disengaged from said actuating means, adjustment means common to all of said keys in a series, for adjusting said interposed member, individual means coöperating with each key in a series, whereby said adjustment means may be differentially adjusted by said keys, a detent member for holding any key in a series depressed to hold said interposed member in its adjusted position, means operated by the main actuating mechanism for releasing any depressed key, means restoring said adjustment means to normal when a depressed key is released, an oscillating lever connected to said interposed member, a cam actuating said lever, a bell crank lever connected with said detent member, and means carried by said cam, whereby said detent member is actuated to permit said interposed member to be restored to normal.

47. In a register, the combination with a type member, a type member actuating means coöperating therewith, whereby said type member may be set in different positions, and a key board embodying therein a series of digit keys whereby the set position of said type member may be predetermined, of an interposed member under the control of said key board and normally disengaged from said actuating means, adjustment means common to all of said keys in a series, for adjusting said interposed member, individual means coöperating with each key in a series, whereby said adjustment means may be differentially adjusted by said keys, a detent member for holding any key in a series depressed to hold said interposed member in its adjusted position, means operated by the main actuating mechanism for releasing any depressed key, means restoring said adjustment means to normal when a depressed key is released, an oscillating lever connected to said interposed member, a cam actuating said lever, a bell crank lever connected with said detent member, means carried by said cam, whereby said detent member is actuated to permit said interposed member to be restored to normal, and normally operative means for releasing said detent member.

48. In a register, the combination with a printing mechanism, embodying therein a type member and means whereby said type member may be set, of a key board embodying therein a series of digit keys, a differentially rotatable member common to all of said keys and adapted to be reciprocated and reciprocatory means carried by said member whereby with the reciprocation of said member said first named means may be actuated to set said type member and means whereby said member may be reciprocated.

49. In a register, the combination with a printing mechanism, embodying therein a type member and means whereby said type member may be set, of a key board embodying therein a series of depressible digit keys, a differentially rotatable member common to all of said keys and adapted to be reciprocated, reciprocatory means carried by said member whereby with the reciprocation of said member said first named means may be actuated to set said type member, means whereby said member actuated by said keys is maintained in any adjusted position and means whereby said member may be reciprocated.

50. In a register, the combination with a printing mechanism, embodying therein a type member and means whereby said type member may be set, of a key board embodying therein a series of depressible digit keys, a differentially rotatable member common to all of said keys and adapted to be reciprocated, reciprocatory means carried by said member whereby with the reciprocation of said member said first named means may be actuated to set said type member, a detent plate common to all said keys whereby any depressed key will be held in its depressed position and said member actuated by said key is maintained in any adjusted position and means whereby said member may be reciprocated.

51. In a register, the combination with a printing mechanism, embodying therein a type member and means whereby said type member may be set, of a key board embodying therein a series of depressible digit keys, a differentially rotatable member common to all of said keys and adapted to be reciprocated, reciprocatory means carried by said member whereby with the reciprocation of said member said first named means may be actuated to set said type member, a detent plate common to all said keys whereby any depressed key will be held in its depressed position and said member actuated by said key is maintained in any adjusted position, independent means for actuating said detent plate, said means being respectively adapted to be operated manually or by the main actuating mechanism to restore any key in the series to normal and means whereby said member may be reciprocated.

52. In a register, the combination with a printing mechanism embodying therein a type member and means whereby said type member may be set, of a key board embodying therein a series of depressible digit keys, a differentially rotatable member common to all of said keys and adapted to be reciprocated, reciprocatory means carried by said member whereby with the reciprocation of said member said first mentioned means may be actuated to set said type member, and a detent plate common to all said keys having a cam surface and a retaining notch coöperating with each key, whereby any depressed key will be held in its depressed position the depression of any key will release any previously depressed key, and said member actuated by said keys is maintained in any adjusted position and means whereby said member may be reciprocated.

53. In a register, the combination with a printing mechanism embodying therein a type member and means whereby said type member may be set, of a key board embodying therein a series of digit keys, a shaft common to all of said keys, coöperating members respectively secured to, and rotatably mounted upon, said shaft, each digit key being in operative connection with said rotatable member, a reciprocatory member mounted on said shaft, a spring normally restoring each key to normal, reciprocatory means carried by said member whereby said first named means may be actuated to set said type member, and means holding said shaft and said reciprocatory member in the adjusted position, whereby the sole function of the key springs is to raise the keys and means whereby said reciprocatory member may be reciprocated.

54. In a register, the combination with a printing mechanism, embodying therein a type member and means whereby said type member may be set, of a key board embodying therein a series of depressible digit keys, a differentially rotatable member common to all of said keys, means carried by said member whereby said first named means may be actuated to set said type member, means whereby said member actuated by said keys is maintained in any adjusted position, a gear rotatable by said rotatable member, a rack meshing therewith and a spring acting on said rack tending to restore said member to normal whereby said member and the means carried thereby will be restored to normal when said last named means is released.

55. In a register, the combination with a printing mechanism embodying therein a type member, and a type member actuating means whereby said type member may be set, of a key board embodying therein a series of digit keys, a rotatable shaft common to all of said keys, a plurality of adjustment boxes secured to said shaft, one for each key in a series, an abutment in each said box, a pinion idly mounted on said shaft adjacent to each box and having a tongue thereon adapted to engage said abutment, said pinions being so set as to cause the engagement of said tongue and said abutment to vary, to impart a differential rotary movement to said shaft, racks on the stem of each key in mesh with a pinion, and means carried by said shaft whereby said type member actuating means may be differentially adjusted to set said type member as predetermined by said keys.

56. In a register, the combination with a printing mechanism embodying therein a type member, and a type member actuating means whereby said type member may be set, of a key board embodying therein a series of digit keys, a rotatable shaft common to all of said keys, a plurality of adjustment boxes secured to said shaft, one for each key in a series, an abutment adjustably mounted in each said box, a pinion idly mounted on said shaft adjacent to each box and having a tongue thereon adapted to engage said abutment, said pinions being so set as to cause the engagement of said tongue and said abutment to vary to impart a differential rotary movement to said shaft, racks on the stem of each key in mesh with a pinion, and means carried by said shaft whereby said type member actuating means may be differentially operated to set said type member as predetermined by said keys.

57. In a register, the combination with a printing mechanism embodying therein a type member, and a type member actuating means whereby said type member may be set, of a key board embodying therein a series of digit keys, a rotatable shaft common to all of said keys, a plurality of adjustment boxes secured to said shaft, one for each key in a series, an abutment in each said box, a pinion idly mounted on said shaft adjacent to each box and having a tongue thereon adapted to engage said abutment, said pinions being so set as to cause the engagement of said tongue and said abutment to vary, to impart a differential rotary movement to said shaft, racks on the stem of each key in mesh with a pinion, means carried by said shaft whereby said type member actuating means may be differentially operated to set said type member as predetermined by said keys, means whereby said shaft is maintained in any adjusted position, a gear rotatable by said shaft, a rack meshing therewith, and a spring acting on said rack tending to restore said shaft to normal whereby said shaft and the means carried thereby will be restored to normal when said last named means is released.

58. In a register, the combination with a printing mechanism embodying therein a plurality of type members, and individual means whereby they may be set, of a keyboard embodying therein a plurality of independently operative series of digit keys, each series of keys having a rotatable shaft common to all of said keys, a plurality of adjustment boxes secured to said shaft, one for each key in a series, an abutment in each said box, a pinion idly mounted on said shaft adjacent to each box and having a tongue thereon adapted to engage said abutment, said pinions being so set as to cause the engagement of said tongue and said abutment to vary, to impart a differential rotary movement to said shaft, racks on the stem of each key in mesh with a pinion, means carried by said shaft whereby said type member actuating means may be differentially operated to set said type member as predetermined by said keys, means whereby said shaft is maintained in any adjusted position, a gear rotatable by said shaft, a rack meshing therewith, and a spring acting on said rack tending to restore said shaft to normal whereby said shaft and the means carried thereby will be restored to normal when said last named means is released.

59. In a register, the combination with a printing mechanism embodying therein a plurality of type members, and individual means whereby they may be set, of a keyboard embodying therein a plurality of independently operative series of digit keys, each series of keys having a rotatable shaft common to all of said keys, a plurality of adjustment boxes secured to said shaft, one for each key in a series, an abutment in each said box, a pinion idly mounted on shaft adjacent to each box and having a tongue thereon adapted to engage said abutment, said pinions being so set as to cause the engagement of said tongue and said abutment to vary, to impart a differential rotary movement to said shaft, racks on the stem of each key in mesh with a pinion, a coupling member slidably mounted on said shaft and rotatable therewith, said coupling member being normally disengaged from said actuating means and being provided with a plurality of longitudinal slots graduated in length whereby the interval of engagement of said coupling with said actuating means will vary with a constant degree of reciprocation of said coupling, means whereby said shaft is maintained in any adjusted position, a gear rotatable by said shaft, a rack meshing therewith, and a spring acting on said rack tending to restore said shaft to normal whereby said shaft and the means carried thereby will be restored to normal when said last named means is released.

60. In a register, the combination with a printing mechanism and actuating means therefor, of a register or total adder comprising a plurality of rotary number wheels, a reciprocating rack actuating each of said number wheels, a transfer mechanism for carrying from a number wheel of one denomination to a number wheel of a higher denomination, means successively actuating said number wheels, whereby the transfer mechanism of one wheel will be operated before the next wheel is rotated and means actuated by said first mentioned actuating means reciprocating said racks.

61. In a register, the combination with a printing mechanism and actuating means therefor, of a register or total adder, comprising a plurality of rotary number wheels, a reciprocating rack actuating each of said number wheels, a transfer mechanism for carrying from a number wheel of one denomination to a number wheel of a higher denomination, means successively actuating said number wheels whereby the transfer mechanism of one wheel will be operated before the next wheel is rotated, means actuated by said first mentioned actuating means reciprocating said racks, and a retardation mechanism whereby a positive stop is imparted to each of said number wheels with each fractional portion of a rotation thereof to prevent the overrunning of the wheel.

62. In a register, the combination with a printing mechanism and actuating means therefor, of a register or total adder comprising a plurality of rotary number wheels, a reciprocating rack actuating each of said number wheels, a transfer mechanism for carrying from a number wheel of one denomination to a number wheel of a higher denomination, means successively actuating said number wheels whereby the transfer mechanism of one wheel will be operated before the next wheel is rotated, means actuated by said first mentioned actuating means reciprocating said racks, a star wheel carried by each of said number wheels and a locking lever member engaging said wheel and a plurality of cam surfaces on said rack, whereby the apices of said cam surfaces hold said member in engagement with said wheel at the end of each fractional movement thereof.

63. In a register, the combination with type members and means whereby said type members may be set, of an imprint making mechanism, a strip support, a strip feeding mechanism, an inking mechanism, and means whereby said imprint making mechanism automatically actuates said strip feeding mechanism with a step by step movement.

64. In a register, the combination with type members and means whereby said type members may be set, of an imprint making mechanism, a strip support, a strip feeding mechanism, comprising a plurality of oppositely disposed friction rollers, a pawl and ratchet mechanism and connections between said pawl and ratchet mechanism and said imprint making mechanism whereby said imprint making mechanism automatically actuates said rollers with a step by step movement, and an inking mechanism.

65. In a register, the combination with type members and means whereby said type members may be set, of an imprint mechanism, a strip support, a strip feeding mechanism, comprising a plurality of oppositely disposed friction rollers, a pawl and ratchet mechanism, connections between said pawl and ratchet mechanism and said imprint making mechanism whereby said imprint making mechanism automatically actuates said rollers with a step by step movement, and a hollow drum disposed beyond said rollers and having an inlet opening through which said rollers project said strip, whereby the printed strip will be automatically coiled.

66. In a register, the combination with type members and means whereby said type members may be set, of an imprint mechanism, a strip support, a strip feeding mechanism, comprising a plurality of oppositely disposed friction rollers, a pawl and ratchet mechanism, connections between said pawl and ratchet mechanism and said imprint making mechanism whereby said imprint making mechanism automatically actuates said rollers with a step by step movement, a hollow drum disposed beyond said rollers and having an inlet opening through which said rollers project said strip, whereby the printed strip will be automatically coiled, means whereby said feeding rollers may be manually actuated and a cut-off mechanism between said rollers and said drum actuated by said last mentioned means.

67. In a register, the combination with type members and means whereby said type members may be set, of an imprint making mechanism, a strip support, a strip feeding mechanism comprising a plurality of oppositely disposed friction rollers, a pawl and ratchet mechanism, and connections between said pawl and ratchet mechanism and said imprint making mechanism whereby said imprint making mechanism automatically actuates said rollers with a step by step movement, inking mechanism, a hollow drum disposed beyond said rollers and having an inlet opening through which said rollers project said strip whereby the printed strip will be automatically coiled, a gear train whereby said roller may be manually turned, one of said gears having diametrically oppositely disposed studs thereon, a shaft mounted eccentrically of said last mentioned gear, tappets on said shaft one of which is adapted to engage either said stud and give a limited rotary movement to its gear, and shears disposed between said drum and said rollers adapted to be actuated by said other tappet after the first tappet disengages its stud to sever the printed strip from the unprinted.

68. In a register, the combination with a plurality of type members, means whereby said type members may be set, and a main actuating mechanism actuating said means, comprising a plurality of cams mounted upon the same shaft and means rotating said shaft, of a strip feeding mechanism, an inking mechanism, an oscillating hammer, and a cam mounted upon the same shaft as the cams of said main actuating mechanism, so set as to actuate said hammer after all said types have been set.

69. In a register, the combination with a plurality of type members, means whereby said type members may be set, and a main actuating mechanism actuating said means, comprising a plurality of cams mounted upon the same shaft and means rotating said shaft, of a strip feeding mechanism, an inking mechanism, an oscillating hammer, a cam mounted upon the same shaft as the cams of said main actuating mechanism, so set as to actuate said hammer after all said types have been set, and connections between said hammer and said ribbon feeding mechanism whereby said cam will both actuate said hammer and said ribbon feeding mechanism.

70. In a register, the combination with type members and means whereby said type members may be set, of an imprint making mechanism, a strip support, a strip feeding mechanism, comprising a plurality of oppositely disposed friction rollers, a pawl and ratchet mechanism and connections between said pawl and ratchet mechanism and said imprint making mechanism whereby said imprint making mechanism automatically actuates said rollers with a step by step movement, and an inking mechanism comprising a plurality of offset spindles carrying respectively a gear, the shaft of one of said feeding rollers having rotatably mounted thereon gears constantly in mesh with the gears on said spindles respectively, a plurality of clutch members rotatable with and movable axially of, said shaft and adapted to alternately engage the pinions on said shaft, and means adapted to be actuated by the ribbon being wound upon a spool carried by one of said spindles to shift said clutch members to simultaneously engage one and disengage the other.

71. In a register, the combination of a filing device, means normally locking same in the closed position, an identification key whereby said last mentioned means may be rendered inoperative, a plurality of type members one of which is adapted to be actuated by said last mentioned means, a plurality of account keys respectively setting a type member, a plurality of series of digit keys, a plurality of members normally engaging number type members, a coupling member positioned between said series of digit keys respectively and each of said number type members, means whereby each of said coupling members is differentially actuated by different keys in a series, a record strip feeding mechanism, a hammer mechanism and a main actuating mechanism adapted to successively actuate said coupling member to set said number types, actuate said hammer mechanism, actuate said record strip feeding mechanism, restore all actuating keys to normal, and close and lock said filing device.

72. In a register, the combination of a filing device, means normally locking same in the closed position, an identification key whereby said last mentioned means may be rendered inoperative, a plurality of type members one of which is adapted to be actuated by said last mentioned means, a plurality of account keys respectively setting a type member, a plurality of series of digit keys, a register or total adder, a plurality of members normally engaging number type members and adapted to actuate said register or total adder, a coupling member, positioned between said series of digit keys respectively and each of said number type members, means whereby each of said coupling members is differentially actuated by different keys in a series, a record strip feeding mechanism, a hammer mechanism and a main actuating mechanism adapted to successively actuate said coupling member to set said number types, actuate said hammer mechanism, actuate said record strip feeding mechanism, restore all actuating keys to normal, and close and lock said filing device.

73. In a register, the combination of a filing device, means normally locking same in the closed position, an identification key whereby said last mentioned means may be rendered inoperative, a plurality of type members one of which is adapted to be actuated by said last mentioned means, a plurality of account keys respectively setting a type member, a plurality of series of digit keys, a register or total adder, a plurality of members normally engaging number type members and adapted to actuate said register or total adder, a coupling member, positioned between said series of digit keys respectively and each of said coupling members differentially actuated by different keys in a series, a special account key adapted to differentially set a type member to indicate different transactions and to simultaneously make said register or total adder inoperative, a record strip feeding mechanism, a hammer mechanism and a main actuating mechanism adapted to successively actuate said coupling member to set said number types, actuate said hammer mechanism, actuate said record strip feeding mechanism, restore all actuating keys to normal, and close and lock said filing device.

74. In a register, the combination of a plurality of series of digit keys, a corresponding number of type members, means in normal engagement with and adapted to actuate said type members, a coupling member adapted to be differentially operated by the keys of any series, a register or total adder actuated by the means adapted to set said type members, a main actuating mechanism embodying therein a plurality of levers controlling said coupling members respectively, a plurality of cams the risers of which are so set as to successively oscillate said levers, the initial movement of one lever being only after the conclusion of the movement of the other, an imprint making mechanism, means actuated after the conclusion of the operation of said cams whereby said imprint making mechanism is actuated, and means under the control of the means actuating said cams and operating after the making of the imprint for automatically restoring all parts to normal.

75. In a register, a main casing, transverse rods therein, and a frame slidably mounted upon said rods, said frame supporting and having mounted therein a record strip feeding mechanism, a record strip rewinding mechanism, an inking mechanism, and a hammer mechanism, whereby said frame and with it said mechanisms may be simultaneously removed in their entirety from the machine.

In witness whereof, I have hereunto affixed my signature, this 8th day of June, in the presence of two witnesses.

GEORGE WHITE.

Witnesses:
T. T. WENTWORTH,
P. FRANK SONNEK.

Copies of this patent may be obtained for five cents each, by addressing the "Commissioner of Patents, Washington, D. C."